United States Patent
Miller et al.

(10) Patent No.: US 10,284,709 B2
(45) Date of Patent: May 7, 2019

(54) APPARATUS AND METHOD FOR IN-VEHICLE LOCATION OF A MOBILE DEVICE

(71) Applicant: FORD GLOBAL TECHNOLOGIES, LLC, Dearborn, MI (US)

(72) Inventors: Thomas Lee Miller, Ann Arbor, MI (US); Eric L. Reed, Livonia, MI (US); Doron M. Elliott, Detroit, MI (US); Bridget Chechak, Novi, MI (US); David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/032,494

(22) PCT Filed: Jan. 6, 2015

(86) PCT No.: PCT/US2015/010311
§ 371 (c)(1),
(2) Date: Apr. 27, 2016

(87) PCT Pub. No.: WO2015/103605
PCT Pub. Date: Jul. 9, 2015

(65) Prior Publication Data
US 2016/0248905 A1 Aug. 25, 2016

Related U.S. Application Data

(60) Provisional application No. 61/923,989, filed on Jan. 6, 2014.

(51) Int. Cl.
*H04W 4/80* (2018.01)
*H04M 1/725* (2006.01)
(Continued)

(52) U.S. Cl.
CPC ....... *H04M 1/72577* (2013.01); *H04W 4/021* (2013.01); *H04W 4/046* (2013.01);
(Continued)

(58) Field of Classification Search
CPC .... H01M 2/34; H01M 10/4257; H01M 2/266; H01M 2/021; H01M 2/1066;
(Continued)

(56) References Cited

U.S. PATENT DOCUMENTS

2011/0105097 A1* 5/2011 Tadayon ............... H04W 4/50
455/418
2011/0178705 A1* 7/2011 Pakzad ................. G01C 21/20
701/533

(Continued)

FOREIGN PATENT DOCUMENTS

WO 2013165989 A2 11/2013

OTHER PUBLICATIONS

International Search Report and Written Opinion for Application No. PCT/US2015/010311, dated May 1, 2015, 10 pages.

*Primary Examiner* — Chuong A Ngo
(74) *Attorney, Agent, or Firm* — Jennifer M. Stec; Brooks Kushman P.C.

(57) ABSTRACT

In at least one embodiment, an apparatus including a controller that is electrically coupled to a plurality of transceivers within a vehicle for enabling bi-directional wireless communication via Bluetooth Low Energy (BLE) between the controller and an occupant communication device (OCD). The controller is further configured to: transmit an advertisement signal indicative of the vehicle being in motion from each transceiver to the OCD via BLE and to receive, at each transceiver, a scan request signal from the OCD via BLE at a first power level. The controller is further configured to determine the location of the OCD in the
(Continued)

vehicle in response to receiving the scan request signal at each transceiver at the first power level.

16 Claims, 12 Drawing Sheets

(51) Int. Cl.
    *H04W 4/021*     (2018.01)
    *H04W 4/04*     (2009.01)
    *H04W 8/00*     (2009.01)
    *H04W 24/10*     (2009.01)

(52) U.S. Cl.
    CPC ............ *H04W 4/80* (2018.02); *H04W 8/005* (2013.01); *H04W 24/10* (2013.01)

(58) Field of Classification Search
    CPC .. H01M 2/0212; H01M 2/344; H01M 10/425; H01M 2/1022; H01M 2200/00; Y10T 29/4911; H04K 3/415; H04W 4/008; H04W 4/02; H04W 4/04
    See application file for complete search history.

(56) References Cited

U.S. PATENT DOCUMENTS

| | | |
|---|---|---|
| 2011/0301780 A1 | 12/2011 | Miller et al. |
| 2012/0006610 A1 | 1/2012 | Wallace et al. |
| 2012/0309410 A1 | 12/2012 | Marti et al. |
| 2013/0017816 A1 | 1/2013 | Talty et al. |
| 2013/0084847 A1 | 4/2013 | Tibbitts et al. |
| 2014/0269278 A1* | 9/2014 | Alexander .............. H04L 51/38 370/230 |

* cited by examiner

APPARATUS AND METHOD FOR IN-VEHICLE LOCATION OF A MOBILE DEVICE

CROSS-REFERENCE TO RELATED APPLICATION

This application is the U.S. national phase of PCT Application No. PCT/US2015/010311 filed on Jan. 6, 2015, which claims the benefit of US Provisional Application Ser. No. 61/923,989 filed on Jan. 6, 2014, the disclosures of which are incorporated in their entirety by reference herein.

TECHNICAL FIELD

Aspects of the present disclosure provide an apparatus and method for a vehicle's infotainment system to collaborate with nomadic mobile devices to determine a location of the mobile device within the vehicle.

BACKGROUND

Distracted driving due to manual interaction with a cellular phone is a growing societal issue. There is an effort to curb the use of cell phones while driving. The National Highway Traffic Safety Administration (NHTSA) has issued guidelines for automotive infotainment systems in an effort to minimize distractions. An example of this is set forth in "Visual-Manual NHTSA Driver Distraction Guidelines for In-Vehicle Device" by the National Traffic Safety Administration. Docket No. NHTSA-2010-0053, Feb. 16, 2012. Within these guidelines, NHTSA is proposing a requirement for cell phones to implement a method to lock out certain tasks while driving. At the international level, the International Telecommunications Union (ITU) initiated a working group to identify any actions that can be taken to address distracted driving.

There are currently several apps available to consumers that will restrict cell phone usage while driving. These apps often require hardware to be installed on the vehicle. Others require the phone to monitor its own speed via global positioning satellite (GPS) information and automatically shut down the phone while traveling at significant speeds. These apps may be popular but not useful due to the voluntary nature of these apps and the inability to discern between a driver and passenger.

SUMMARY

In at least one embodiment, an apparatus including a controller that is electrically coupled to a plurality of transceivers within a vehicle for enabling bi-directional wireless communication via Bluetooth Low Energy (BLE) between the controller and an occupant communication device (OCD). The controller is further configured to: transmit an advertisement signal indicative of the vehicle being in motion from each transceiver to the OCD and to receive, at each transceiver, a scan request signal from the OCD at a first power level. The controller is further configured to determine the location of the OCD in the vehicle in response to receiving the scan request signal at each transceiver at the first power level.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Figure 1:
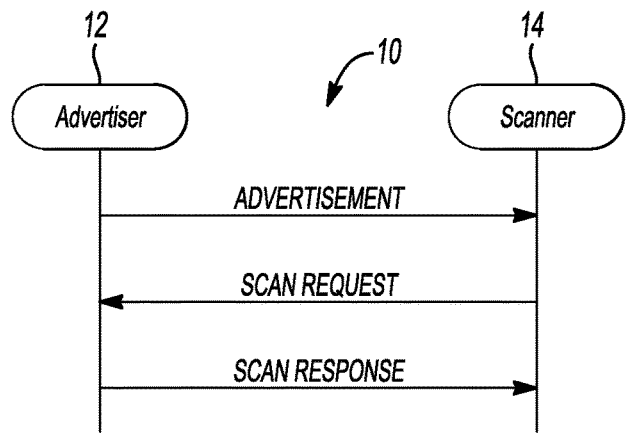
FIG. 1 depicts an implementation that utilizes Bluetooth Low Energy (BLE) for wireless communication.

Aspects disclosed herein are generally facilitated utilize portions of Bluetooth Low Energy (BLE) to enable two devices to communicate without being paired and/or connected (i.e., previously electrically mated in order to facilitate electrical communication). For example, FIG. 1 illustrates an implementation 10 that utilizes Bluetooth Low Energy (BLE) for wireless communication. The implementation 10 includes an advertiser 12 that is arranged to transmit an advertisement signal (or signal ADV). The implementation 10 further includes a scanner 14 for transmitting a scanner request signal (or signal SCAN_REQ) in response to the signal ADV. The signal ADV may be somewhat generic in that the signal may include simple data such as an identification of the source that transmits the signal (e.g., in this case the advertiser 12, a name and/or manufacturer specific data (e.g. weight, location, etc.)). The scanner 14 is configured to scan for the signal ADV. Depending on the situation or circumstance, the scanner 14 may ignore the signal ADV or simply process the data for various functions. The scanner 14 may optionally transmit the signal SCAN_REQ to the advertiser 12 in order to obtain information of interest from the advertiser 12.

Consider the following example, an indoor shopping mall may include an array of advertisers 12 to advertise location information (or transmit/advertise the signal ADV) throughout the mall. The scanner 14 may use the location information as received from the signal ADV to navigate to a particular location within the mall. At the same time, various stores may each utilize the scanner 14 to receive the signal ADV to receive sales promotion from the various advertisers 12. As the scanner 14 passes by the advertiser 12 located at a particular store, the scanner 14 may alert the user of a sale promotion as a function of user preferences (e.g. cookies, settings, history, etc.). Additionally, the advertiser 12 may be configured to receive signal SCAN_REQ from the scanner 14 such that the advertiser 12 provides additional information to the scanner 14 based on the signal SCAN_REQ. One advantage of the relationship between advertiser 12 and the scanner 14 is that neither device has to be electronically paired with one another for each to transmit and/or receive information between each device.

It is recognized that the BLE advertiser 12 and the scanner 14 configuration can be extended or applied to the automotive environment for determining a location of various occupant communication devices (OCDs) in a vehicle and for selectively restricting usage of the OCD based on the location of the OCD within the vehicle and possibly further based on other conditions. For example, such OCDs may comprise cell phones, etc.

Figure 2:
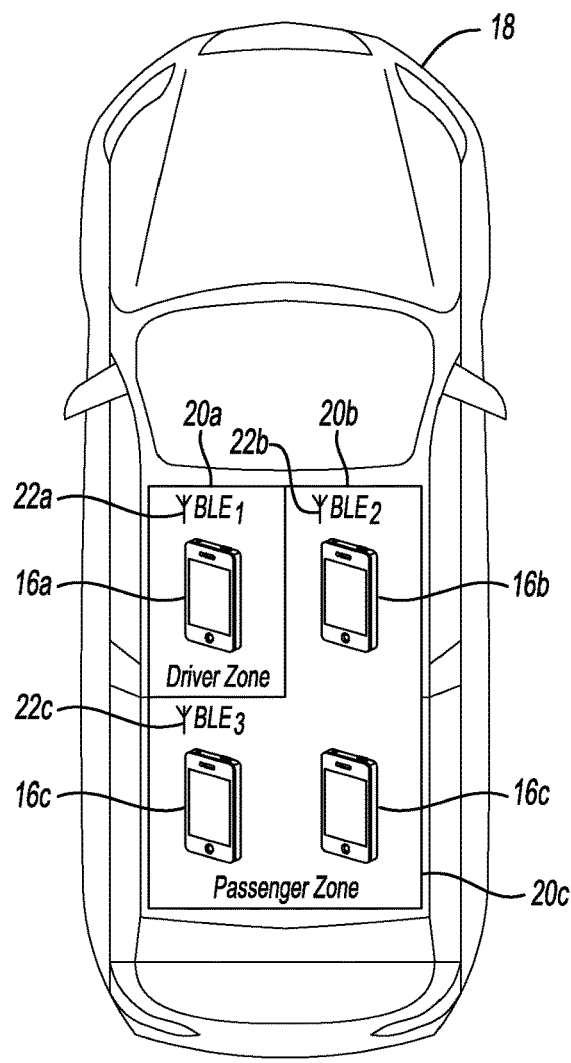
FIG. 2 depicts an arrangement in which a plurality of occupant communication devices (OCDs) may be arranged in a vehicle.

FIG. 2 depicts an arrangement in which a plurality of occupant communication devices (OCDs) 16a-16n ("16") may be arranged in a vehicle 18. In general, the vehicle 18 may be divided into various zones 20a, 20b, and 20c ("20"). Zone 20a generally corresponds to a driver zone which is an area in the vehicle 18 that is occupied by a driver. The zone 20b-20c generally corresponds to a passenger zone which is an area in the vehicle 18 that is occupied by passenger(s). Specifically, zone 20b may be a front of the vehicle that is occupied by a passenger and zone 20c may be a rear of the vehicle that is occupied by at least one passenger. In some cases, it is desirable to restrict OCD usage for drivers in the driver zone 20a to avoid driver distraction. However, such an implementation should recognize when the OCD 16 is located in the passenger zone 20b or 20c, the vehicle 18 must avoid restricting usage of the OCD 16 for passengers (i.e., non-drivers). A plurality of transceivers 22a-22c ("22") is positioned in the zone 20a-20c, respectively. In one example, the transceiver 22a may be positioned in a driver's seat (not shown) in the zone 20a of the vehicle 18, the transceiver 22b may be positioned at a front passenger's seat (not shown) in the zone 20b of the vehicle 18, and the transceiver 22c may be positioned in a rear seat (not shown) in the zone 20c of the vehicle 18. The transceivers 22 and a controller (not shown in FIG. 2), may be defined as an advertiser 12 and transmit/receive information to/from the OCD 16 in a BLE environment to ascertain the location of the various OCDs 16 in the vehicle 18. These aspects will be described in more detail below. It is recognized that there may be any number of transceivers 22 positioned in the vehicle as well as any number of zones 20 that are established in the vehicle 18.

Figure 3:
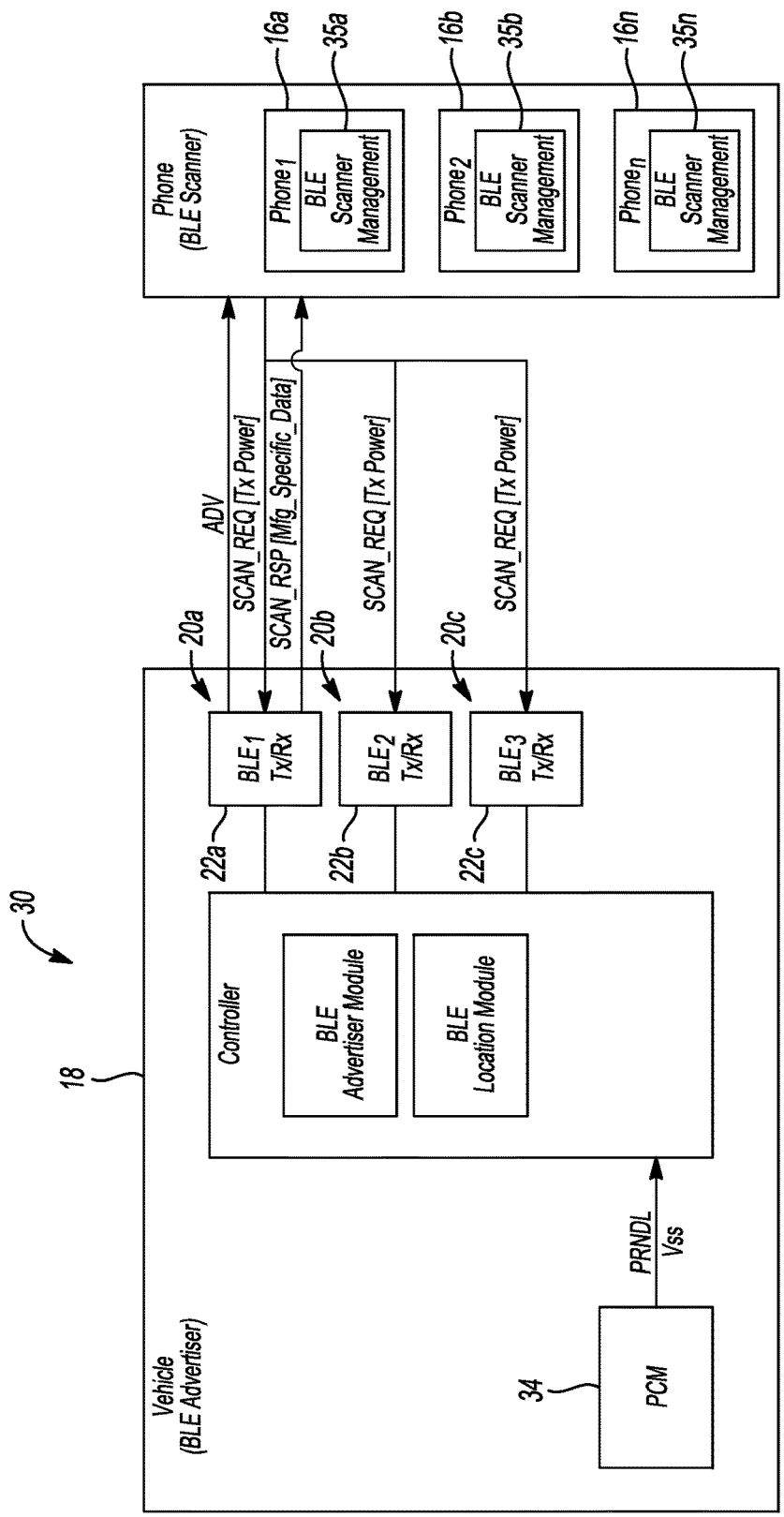
FIG. 3 depicts an apparatus for determining a location of the OCDs in accordance to one embodiment.

FIG. 3 depicts an apparatus 30 for determining a location of the OCD 16 in the vehicle 18 in accordance to one embodiment. The apparatus 30 generally includes the transceivers 22, a controller 32, and a powertrain control module (PCM) 34. It is recognized that the transceivers 22a-22c are positioned in zones 20a-20c, respectively. The controller 32 and the transceivers 22a-22c are configured to engage in bi-directional communication, via BLE, with the OCDs 16a-16n. The controller 32 is configured to determine the location of the OCD(s) 16 through the bi-directional communication with the OCDs 16. The controller 32 is configured to notify the various OCDs 16a-16n as to which zone 20 they are located in. The controller 32 is further configured to notify the OCD 16 that is in the driver zone 20a when the vehicle 18 is in a "driver mode" and a "stationary mode" or whether the vehicle 18 has transitioned to an OFF state. The driver mode generally corresponds to the condition in which the vehicle 18 is moving (i.e., when vehicle speed is greater than a predetermined threshold). The PCM 34 is configured to transmit information indicative of either the speed of the vehicle or transmission status (e.g., Park, Neutral, Reverse, Low, or Drive) to the controller 32. The controller 32 will notify the OCD(s) 16 when the vehicle 18 is moving based on the information from the PCM 34.

In the event the vehicle 18 is moving (e.g., vehicle speed greater than the predetermined threshold, or vehicle is moving based on transmission status), then the controller 32 controls the transceivers 22a-22c to transmit data on the signal ADV to the OCDs 16 in the vehicle 18 (or in the zones 20a-20c) that the vehicle 18 is moving. The controller 32 may then assess the signal strength for each signal (e.g., see signal SCAN_REQ) received back from the various OCDs 16 to determine the location of the OCD 16 in the corresponding zone 20. Once the controller 32 determines the location (or zone 20) for each OCD 16, the controller 32 notifies each OCD 16 as to its location in the vehicle 18 via a signal SCAN_RSP. Any OCD 16 that is detected to be in the driver zone 20a may then impose restrictions to restrict usage if the vehicle 18 is in the driver mode. The controller 32 is generally configured to establish a database (not shown) for the OCD(s) 16 detected in the vehicle 18 and to further employ a calculated exponentially weighted average for the signal strength of each signal SCAN_REQ as received from the OCD(s) 16 in relation to the transceivers 22a-22c to determine the locations of the OCD(s) 16 in the vehicle 18.

The controller 32 includes a BLE advertiser management module 36 that manages the transmission of the signal ADV to the OCDs 16. For example, the module 36 may transmit the signal ADV as a periodic advertisement that includes, but not limited to the following characteristics (i) BLE ID (unique ID assigned to all BLE devices per Bluetooth specifications); (ii) a name assigned by the manufacturer (e.g. red Taurus) to the vehicle 18, (iii) a type, which in this case is manufacturer specific (In Vehicle Location System ("IVLS")), and (iv) vehicle status, which is manufacturer specific (e.g., vehicle is stationary, vehicle is in motion, or transition of ignition status from ON to OFF). The IVLS indicator is unique to vehicles and in this case, the receipt of the IVLS at the OCD 16 will indicate to the OCD 16 that the OCD 16 is communicating with a vehicle 18 instead of another device such as for example a printer, portable speaker, etc. The IVLS designation may allow the OCD 16 to filter and prioritize advertisements from the vehicle 18.

Each OCD 16 will periodically scan for BLE advertisements (or for the signal ADV) from the controller 32. Each OCD 16 may also initiate a scan during wake up due to user input. If the OCD 16 detects two or more receptions of the signal ADV from the various transceivers 20a-20c, then the OCD 16 may filter out the signal ADV (or advertisement) with a highest signal strength and then conduct various tests to determine if the OCD 16 is in the vehicle 18 that transmitted the signal ADV (or the advertisement). It must be noted that it is possible for one or more OCDs 18 in the vehicle 18 to receive the signal ADV from vehicle(s) that neighbor or are in close proximity to the vehicle 18. Thus, the OCD 16 (or a BLE scanner management module 35a, 35b, or 35c ("35") within the OCD 16) is required to make a determination as to whether the OCD 16 is located in the vehicle 18 that actually transmitted the signal ADV. First, the OCD 16 will determine if it has a history with the vehicle 18. In general, the OCD 16 develops or builds up a history of known vehicle that the OCD 16 can use to quickly identify vehicles. If the OCD 16 determines that it has a history with the vehicle 18, then the OCD 16 via the BLE scanner management module 35 may transmit a series of scan requests (or a series of transmissions of the signal SCAN_REQ) to the advertiser (e.g., the controller 32 and the transceivers 22).

If the OCD 16 does not have a history with the vehicle 18 (e.g., first time the OCD 16 receives the signal ADV from the vehicle 18), then the OCD 16 will check the vehicle status on the signal ADV to determine if the vehicle 18 is in motion (i.e., the vehicle is in the driver mode). It is recognized that the OCD 16 will check vehicle status (e.g., vehicle in motion or vehicle transitions to OFF, etc.) irrespective of whether it has a history with the OCD 16. If so, the OCD 16 will wait for a short period of time to determine if a second transmission of the signal ADV has been transmitted from the controller 32. If the OCD 16 receives the signal ADV again within the short period of time, then the OCD 16 determines that it is traveling in the vehicle 18. Once the OCD 16 associates itself with an IVLS indicator on the signal ADV from the vehicle 18, then the OCD 16 transmit a series of scan requests (or transmits the signal SCAN_REQ a number of times) to the vehicle 18 at minimum power. The more transmissions the controller 32 receives from the OCD 16, the more samples the controller 32 can process to determine the location of the OCD(s) 16. It is recognized that each OCD 16 transmits a series of scan requests at minimal power to ensure signal strength disparity among the transceivers 22 in the vehicle 18. As noted above, the transceivers 22 are each located in a corresponding zone in the vehicle 18. Thus, if the OCD 16 is located in the driver zone 20a and transmits the signal SCAN_REQ, a disparity in terms of signal strength will be present at the different transceivers 22 and the transceiver 22a in the driver zone 20a will receive the signal SCAN_REQ at the highest signal strength and the transceivers 22 in the passenger zones 22b-22c will receive the signal SCAN_REQ at a lower signal strength. The controller 32 includes a BLE location module 38 to determine the received signal strength for each receipt of the signal SCAN_REQ.

As noted above, the controller 32 is configured to receive the signal SCAN_REQ from each OCD 16. If the controller 32 includes historical data associated with the OCD 16 (i.e., this corresponding OCD 16 has been in the vehicle 18 previously), then the controller 32 retrieves historical metrics with respect to the OCD 16. If not, then the controller 32 creates a new database for the newly detected OCD 16. The controller 32 (or the BLE location module 38) may then calculate an exponentially weighted average ("EWA") for the signal strength for each received signal SCAN_REQ received from the OCD(s) 16 that is received at each of the selectively placed transceivers 22. It is recognized that the controller 32 may utilize any form of mathematical manipulation and/or filtering to process the determined signal strength. The EWA as employed by the controller 32 is provided for illustrative purposes.

The controller 32 may then conduct a series of tests to determine the most likely position of the OCD 16 within the vehicle 18. For example, the controller 32 may check the total number of samples taken at each of the transceivers 22 in the vehicle 18. If the controller 32 determines that there aren't an adequate number of samples, then the controller 32 may designate the position of the OCD 16 as "indeterminate". Otherwise, the controller 32 compares a disparity among EWA metrics to a threshold to determine the most likely position. For example, if the EWA at transceiver 22b is greater than the EWA at transceiver 22a by a magnitude of $t_1$, then the controller 32 determines that the OCD 16 is most likely near or in the zone 20b (e.g., the front passenger zone) and assign the position as "passenger". The controller 32 transmits the location information on the signal SCAN_RSP to the OCD 16 in the zone 20b. Likewise, if the EWA at the transceiver 22c is greater than the EWA at the transceiver 22a by a magnitude of $t_2$, then the controller 32 determines that the OCD 16 is most likely near or in the zone 20c (e.g., the rear passenger zone) and assign the position as "passenger". The controller 32 transmits the location information on the signal SCAN_RSP to the OCD 16c in the zone 20c. If the EWA at the transceiver 22a is greater than $t_3$, then the controller 32 determines that the OCD 16 is most likely in the zone 20a (e.g., the driver zone). Otherwise, it will assign the position as "indeterminate." For example, in this case, the OCD 16 may be outside of the vehicle 18. Once the most likely position is determined by the controller 32, the controller 32 transmits the signal SCAN_RSP to the OCD 16 to notify the same of its position (e.g., the in-vehicle-location (position) data) in the vehicle 18.

The OCD 16 extracts the in-vehicle-location (position) data from the signal SCAN_RSP once received. If the position is "passenger", then the OCD 16 operates in "normal" mode (i.e., full functionality with no restrictions). If the position is "driver" (i.e., the OCD 16 is in the driver zone 20a), then the OCD 16 will enter into the "driver mode" if the vehicle 18 is moving. While in driver mode, the OCD 16 may modify its user interface of select features to accommodate a driver. These features may include, but not limited to, simplifying menu options, enlarging icons, etc. Additionally, the OCD 16 may also restrict certain features that are deemed distractive to the driver such as games, videos, manual texting, etc.

As long as the user is actively using the OCD 16, such an OCD 16 will periodically ping the controller 32 so as to ascertain its position in the vehicle 18. If the controller 32 ceases to respond, or if the controller 32 transmits the signal ADV indicating that the ignition status of the vehicle transitions to OFF, then the OCD 16 will clear all counters and return to normal operation. The counters may be used to limit scan request attempts at the OCD 16. Likewise, when the vehicle 18 shuts down, the controller 32 transmits a final signal ADV indicating that the ignition status has transitioned to OFF and clears all scanner databases. These aspects and others will be described in more detail in connection with FIGS. 5 and 6.

Figure 4:
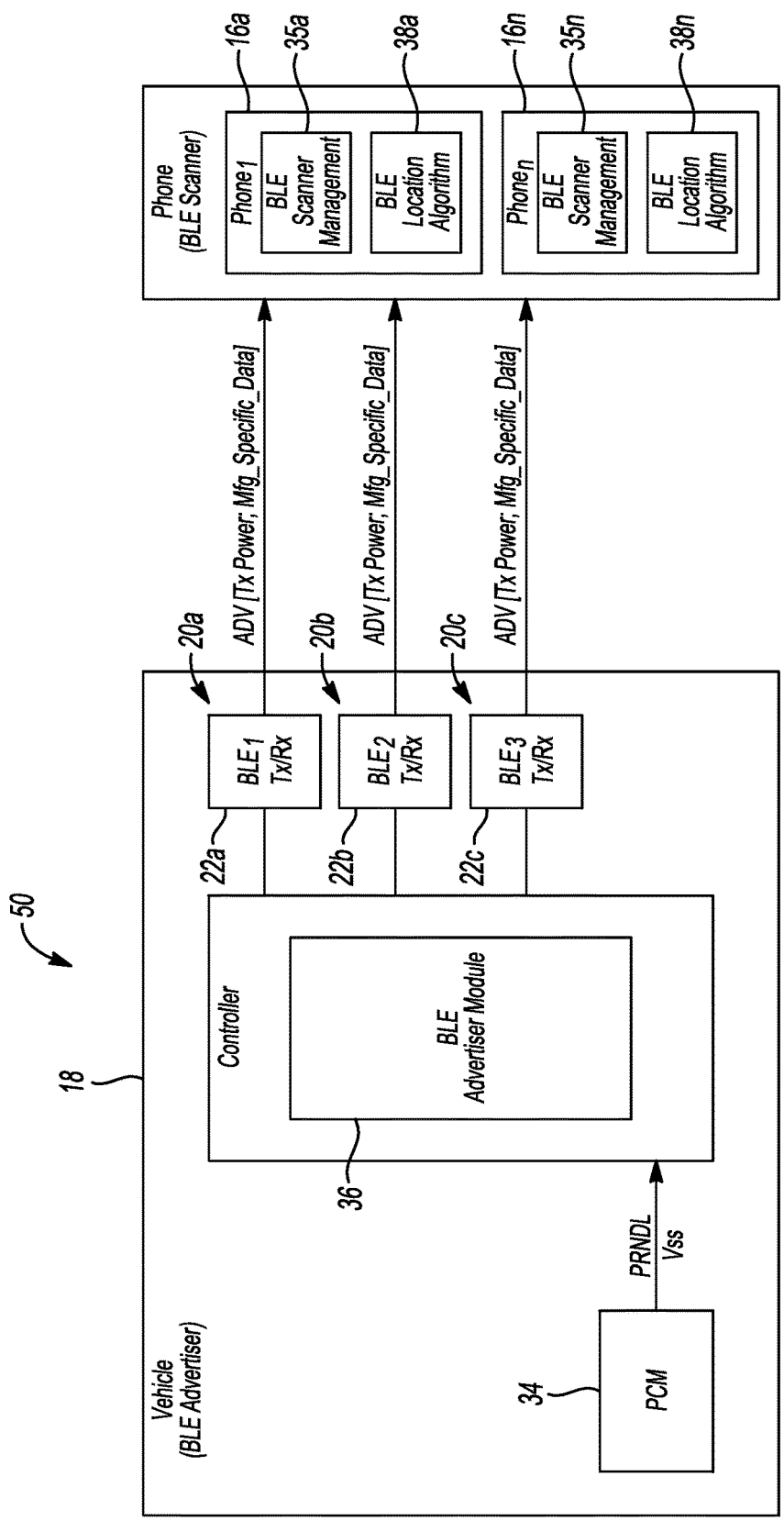
FIG. 4 depicts an apparatus for determining the location of the OCDs in accordance to one embodiment.

FIG. 4 depicts an apparatus 50 for determining the location of the OCDs 16 in the vehicle 18 in accordance to one embodiment. The apparatus 50 differs from the apparatus 30 of FIG. 3 in that the OCDs 16 each include the BLE location module 38 for determining its corresponding location in the vehicle 18 based on the receipt of the signal ADV from the controller 32. The controller 32 and the transceivers 22 serve as the advertiser and the OCDs 16 each serve as the scanner. The BLE location module 38 processes the advertisements (i.e., the signal ADV) from the strategically placed transceivers 22. The controller 32 in this case, may be a simple advertiser and may not service any scan request (e.g., signal SCAN_REQ) from the OCDs 16.

The controller 32 initiates the communication with the OCD 16 by periodically transmitting the signal ADV that includes the following: (i) a unique ID for the controller 32 in addition to a unique ID for each transceiver 22 (i.e., the unique ID is assigned to all BLE devices per Bluetooth specifications), (ii) a name assigned by the vehicle manufacturer (e.g., red Taurus)(or alternatively, a vehicle identification number (VIN), (iii) a type, which in this case is manufacturer specific (In Vehicle Location System—IVLS), (iv) manufacturing specific data such as vehicle status (e.g., vehicle is stationary, vehicle is in motion, or transition of ignition status from ON to OFF), zone information (e.g., driver zone (or zone 20a), front passenger zone (or zone 20b), or rear passenger zone (or zone 20c)), alternatively the zone information corresponds to the particular zone 20 each corresponding transceiver 22 is positioned in, and a total number of advertisers in the vehicle 18.

Each OCD 16 will periodically scan for the signal ADV from the various transceivers 22. Each OCD 16 is configured to perform a series of tests to determine if the OCD 16 is in the vehicle 18. First, the OCD 16 will identify a complete set of advertisements (or a complete set of the signals ADV) based on the total number of the advertisers in the vehicle 18. For example, in this case, the OCD 16 determines if it has received a signal ADV from each transceiver 22 in each zone 20. If the OCD 16 has a prior history with the vehicle 18, then the OCD 16 will associate itself with the vehicle 18 and initiate the in-vehicle-location process. If not, the OCD 16 will examine whether the vehicle 18 is in motion as provided on the signal ADV from the vehicle 18. The OCD 16 will then conduct another scan of the various signal ADV(s) that are received to try and determine if it is in a known vehicle 18. If the OCD 16 cannot ascertain that it is in a known vehicle 18, then the OCD 16 will conduct another scan so long as the user is still using the OCD 16 .... Otherwise, the OCD 16 will associate itself with the advertiser (or transceiver 22) that transmits the signal ADV with the highest received signal strength (RSS) and begins the in-vehicle-location process.

Once the OCD 16 associates itself with the vehicle 18, the OCD 16 conducts a series of tests to determine the most likely position of the OCD 16 within the vehicle 18. First, the OCD 16 (or the BLE location module 38) calculates the signal strength for each signal ADV as received from the corresponding transceiver 22 and then determines the EWA for each signal ADV that is received. As noted above, it is recognized that any form of mathematical manipulation and/or filtering may be used to process the determined signal strength. The EWA as employed by the OCD 16 is provided for illustrative purposes. The OCD 16 may then check the total number of samples advertisements (i.e., total number of received signals (or signal ADV) from each transceiver 22. If a sufficient number of samples have not been received, then the OCD 16 will determine that its position in the vehicle 18 as "indeterminate". Otherwise, the OCD 16 will compare the disparity of the EWA metrics to a threshold to determine the most likely position. For example, if the EWA at the transceiver 22b (in zone 20b (passenger front zone)) is greater than the EWA at the transceiver 22a (in zone 20a (driver zone)) by a magnitude of $t_1$, then the OCD 16 will determine that it is most likely near the transceiver 22b (e.g., in the front passenger's seat) and assign its location as being in the zone 20b (or in the front passenger zone). Likewise, if the EWA at the transceiver 22c is greater than the EWA at transceiver 22a by a magnitude of $t_2$, then the OCD 16 will determine that it is most likely near the transceiver 22c (e.g., in rear seat) and assign its location as being in zone 20c. If neither the EWA is significantly greater than the EWA at the transceiver 22a, then the OCD 16 will determine if the EWA at transceiver 22a is significant enough to assign the position as "driver" (or in the zone 20a). Otherwise, the OCD 16 will assign the position as "indeterminate".

If the OCD 16 determines that the location or position is in the zone 20b or 22c, then the OCD 16 operates in "normal" mode (e.g., full functionality). If the OCD 16 determines that the location or position is in the zone 20a (e.g. driver zone), then the OCD 16 enters into the driver mode. While in driver mode, the OCD 16 may modify its user interface of select features to accommodate a driver. This may include, but not limited to, simplifying menu options, enlarging icons, etc.). The OCD 16 may also restrict certain features deemed distractive to the driver such as games, videos, manual texting, etc.

As long as the user is actively using the OCD 16, the OCD 16 will periodically scan the advertisements (or the signal ADV from the vehicle 18) to monitor its own position or location. If the OCD 16 stops receiving the signal ADV, the OCD 16 will clear all of the metrics and return to normal operation. If the OCD 16 receives information indicating that the ignition is "OFF", then the OCD 16 returns to normal operation.

Figure 5A:
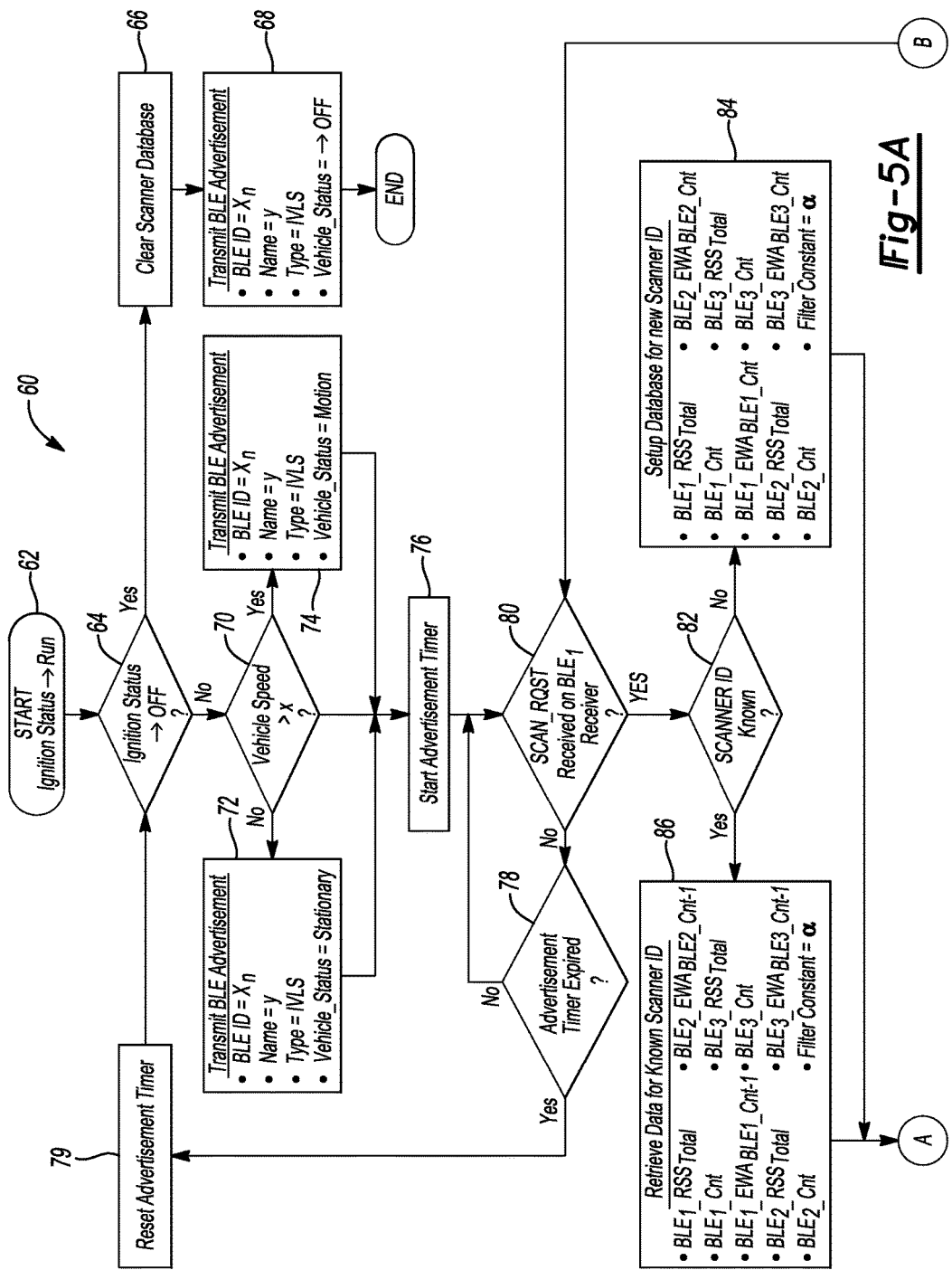
FIGS. 5a-5b depict a method for determining the location of the OCDs utilizing the apparatus of FIG. 3 in accordance to one embodiment.
Figure 5B:
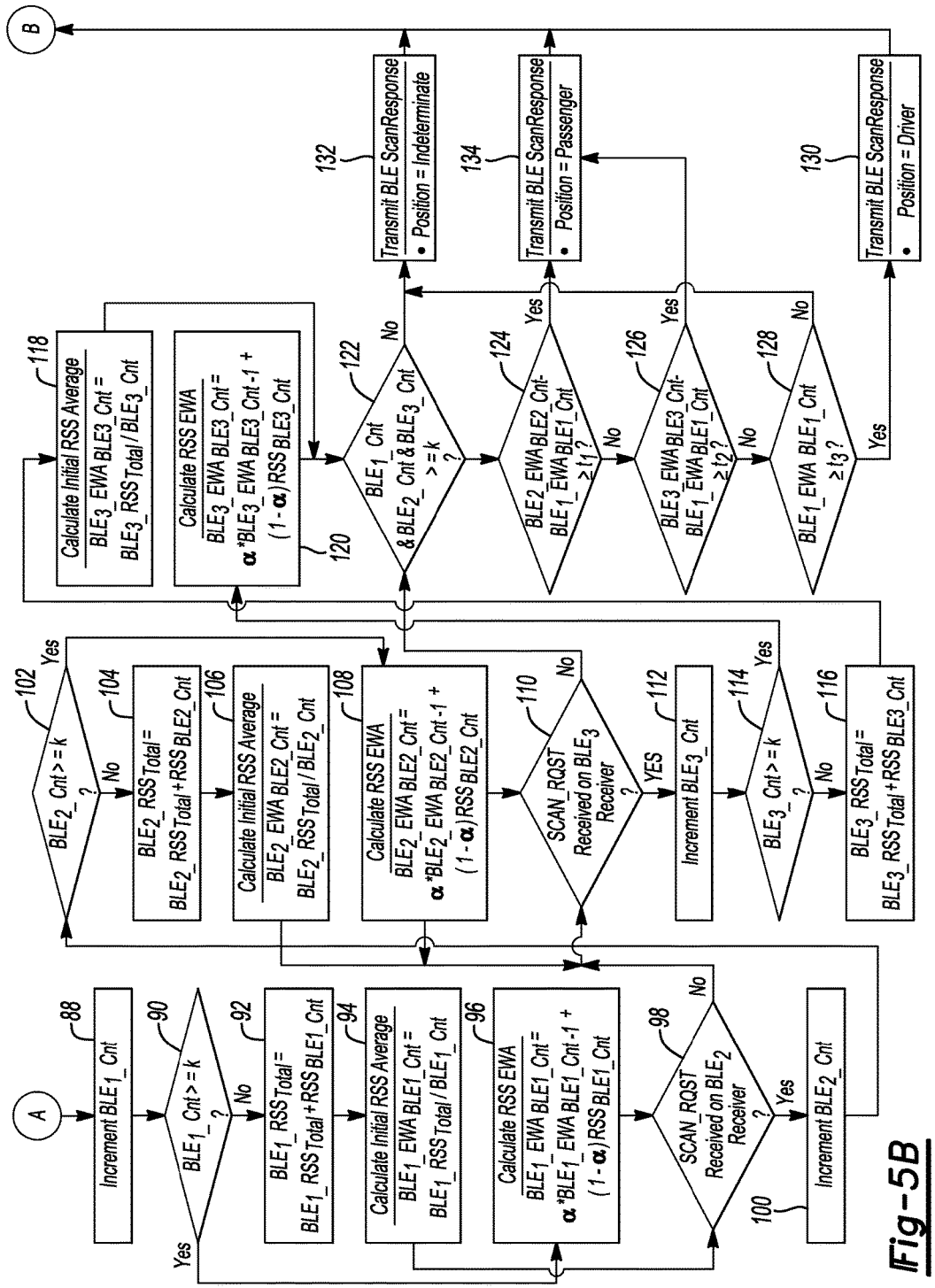

FIGS. 5a-5c depict a method 60 for determining the location of the OCD(s) 16 utilizing the apparatus 30 of FIG. 3 in accordance to one embodiment. The method 60 generally illustrates various operations executed in connection with the OCD 16 in FIG. 3.

In operation 62, the controller 32 receives a signal from a body control module (not shown) in the vehicle 18 that indicates that an ignition switch (also not shown) is in a "RUN" position.

In operation 64, the controller 32 determines whether ignition status for the ignition switch has transitioned to an "OFF" state. If this condition is true, then the method 60 proceeds to operations 66 and 68. If not, then the method 60 proceeds to operation 70.

In operation 66, the controller 32 clears data corresponding to received signal strength values that were generated in connection with receiving the signal SCAN_REQ from the various OCD(s) 16 in the vehicle 18.

In operation 68, the controller 32 transmits (e.g., via the transceivers 22) the signal ADV to the OCD(s) 16 that the vehicle 18 has shut off. In this case, any OCD 16 that is detected to be in the vehicle 18 can resume normal operation.

In operation 70, the controller 32 determines whether the vehicle 18 is moving based on information provided by the PCM 34 (e.g., vehicle status (vehicle speed >x or transmission status=R, D, L). If this condition is not true, then the method 60 proceeds to operation 72. If true, then the method 60 proceeds to operation 74.

In operation 72, the controller 32 transmits the signal ADV (e.g., via the transceivers 22) to the OCD(s) 16. The signal ADV in this case will indicate to the OCD(s) 16 that the vehicle 18 is stationary.

In operation 74, the controller 32 transmits the signal ADV (e.g., via the transceivers 22) to the OCD(s) 16. The signal ADV in this case will indicate to the OCD(s) 16 that the vehicle 18 is moving (or the vehicle 18 is in the driver mode).

In operation 76, the controller 32 initiates a timer to determine whether the OCD(s) 16 has responded back to the signal ADV with the signal SCAN_REQ.

In operation 80, the controller 32 determines whether the signal SCAN_REQ has been received from the OCD(s) 16. As noted above, the OCD(s) 16 may transmit the signal SCAN_REQ in response to receiving the signal ADV. Each OCD 16 is arranged to transmit the signal SCAN_REQ at a low transmission power to create diversity at the transceivers 22. If the controller 32 has determined that one or more of the signals SCAN_REQ has been received, then the method 60 moves to operation 82. If not, then the method 60 moves to operation 78.

In operation 78, the controller 32 determines whether the timer as set in connection with operation 76 has expired. If this condition is true, then the method 60 proceeds to operation 79. This condition indicates that there may not be any OCD(s) 16 in the vehicle 18. If the condition of operation 78 is false, then the method 60 moves back to operation 80.

In operation 79, the controller 32 resets the timer and moves back to operation 64 to determine ignition status for the vehicle 18.

In operation 82, the controller 32 determines whether the received signal SCAN_RST has an identification that was previously received/recognized by the controller 32 (i.e., by the vehicle 18). If this condition is true, then the method 60 moves to operation 86. This condition indicates that the OCD(s) 16 have been previously used in the vehicle 18 in the past. If the condition of operation 82 is not true, then the method 60 moves to operation 84. This condition indicates that this may be the first time the OCD 16 has been in the vehicle 18 as there is no historical data available on the OCD 16.

In operation 84, the controller 32 establishes a new database for the OCD 16 that is first used in the vehicle 18 for the first time. Specifically, the controller 32 establishes the database to store information corresponding to the received signal strength ($RSS_{total}$) at the transceiver 22a (or $BLE_1\_RSS_{total}$ as shown in FIG. 5), the received signal strength ($RSS_{total}$) at the transceiver 22b (or $BLE_2\_RSS_{total}$ as shown in FIG. 5), and the received signal strength ($RSS_{total}$) at the transceiver 22c (or $BLE_3\_RSS_{total}$ as shown in FIG. 5). In addition, the controller 32 will store a count for each signal strength measurement that is performed at the vehicle 18 (e.g., $BLE_1\_Cnt$, $BLE_2\_Cnt$, and $BLE_3\_Cnt$). The controller 32 will also store the exponentially weighted average ($BLE_3\_EWA_{BLE1\_Cnt}$) for the transceiver 22a, an exponentially weighted average ($BLE_2\_EWA_{BLE2\_Cnt}$) for the transceiver 22b, and an exponentially weighted average ($BLE_3\_EWA_{BLE3\_Cnt}$) for the transceiver 22c. The controller 32 includes a filter to determine the exponentially weighted average at each transceiver 22. The controller applies a variable a to determine the amount of filtering that is applied. For example, the variable a may correspond to a value between 0 and 1 and indicates the amount of filtering that is applied (e.g., if $\alpha=0$, then no filtering is performed whereas if $\alpha=1$, then a maximum amount is performed).

In operation 86, the controller 32 initiates the process or retrieving data for the received signal strength or ($BLE_1\_RSS_{total}$), ($BLE_2\_RSS_{total}$), and ($BLE_3\_RSS_{total}$), the count for each signal strength measurement or ($BLE_1\_Cnt$), ($BLE_2\_Cnt$), and ($BLE_3\_Cnt$), and the EWA ($BLE_1\_EWA_{BLE1\_Cnt}$), ($BLE_2\_EWA_{BLE2\_Cnt}$), ($BLE_3\_EWA_{BLE3\_Cnt}$) for the OCD 16 that has a history with the vehicle 18.

In operation 88, the controller 32 increments the count for $BLE_1\_Cnt$. It is recognized that the controller 32 measures the signal strength of the signal at the transceiver 22a to generate a count if the controller 32 has not received a signal from the OCD 16, or to increment a previous count if the controller 32 detects that it has received a previous signal from the OCD 16.

In operation 90, the controller 32 compares the incremented count to $BLE_1\_Cnt$ to determine if the overall count has exceeded a predefined threshold. In this case, it is desirable to have enough samples before calculating the EWA for the transceiver 22a. If this condition is true, then the method 60 proceeds to operation 96. If not, then the method 60 proceeds to operation 92.

In operation 92, the controller 32 uses the latest received sample (e.g., $RSS_{BLE1\_Cnt}$) to determine the received signal strength $BLE_1\_RSS_{total}$ at the transceiver 22a.

In operation 94, the controller 32 calculates an initial EWA (i.e., a simple mean) (e.g., ($BLE_1\_EWA_{BLE1\_Cnt}$) for the transceiver 22a based on the received signal strength $BLE_1\_RSS_{total}$ and on the count $BLE_1\_Cnt$.

In operation 96, the controller 32 calculates a first EWA (e.g., ($BLE_1\_EWA_{BLE1\_Cnt}$) for the transceiver 22a after determining that the incremented count $BLE_{1\_Cnt}$ exceeds the predefined threshold (see operation 90). The first EWA as calculated in operation 96 differs from the initial EWA in that the initial EWA was based on a count that is not greater than the predefined threshold. Thus, because the first EWA is based on a sufficient number of samples, this value may have a higher confidence rate than the initial EWA. In general, the controller 32 applies a low pass filter based on:

$$BLE_1\_EWA_{BLE1\_Cnt} = \alpha * BLE_1\_EWA_{BLE1\_Cnt-1} + (1-\alpha) RSS_{BLE1\_Cnt} \quad (EQ.\ 1)$$

where $BLE_1\_EWA_{BLE1\_Cnt-1}$ corresponds to a previous expected weighted average of previously measured strength values at the transceiver 22a and $RSS_{BLE1\_Cnt}$ corresponds to the most recent signal strength of the received signal at the transceiver 22a.

In operation 98, the controller 32 determines whether the signal SCAN_REQ was received at the transceiver 22b from the OCD 16. If this condition is true, then the method 60 moves to operation 100. If not, then the method 60 moves to operation 110.

In operation 100, the controller 32 increments the count for $BLE_2\_Cnt$. It is recognized that the controller 32 measures the signal strength of the signal at the transceiver 22b to generate a count if the controller 32 has not received a signal from the OCD 16, or to increment a previous count if the controller 32 detects that it has received a previous signal from the OCD 16.

In operation 102, the controller 32 compares the incremented count to $BLE_2\_Cnt$ to determine if the overall count has exceeded the predefined threshold. Again, it is desirable to have enough samples before calculating the EWA for the transceiver 22b. If this condition is true, then the method 60 proceeds to operation 108. If not, then the method 60 proceeds to operation 104.

In operation 104, the controller 32 uses the latest received sample (e.g., $RSS_{BLE2\_Cnt}$) to determine the received signal strength $BLE_2\_RSS_{total}$ at the transceiver 22b.

In operation 106, the controller 32 calculates an initial EWA (i.e., a simple mean) (e.g., $(BLE_2\_EWA_{BLE2\_Cnt})$ for the transceiver 22b based on the received signal strength $BLE_2\_RSS_{total}$ and on the count $BLE_2\_Cnt$.

In operation 108, the controller 32 calculates a second EWA (e.g., $(BLE_2\_EWA_{BLE2\_Cnt})$ for the transceiver 22b after determining that the incremented count $BLE_{2\_Cnt}$ exceeds the predefined threshold (see operation 102). The second EWA as calculated in operation 108 differs from the initial EWA in that the initial EWA was based on a count that is not greater than the predefined threshold. Thus, because the second EWA is based on a sufficient number of samples, this value may have a higher confidence rate than the initial EWA. In general, the controller 32 applies a low pass filter based on:

$$BLE_2\_EWA_{BLE2\_Cnt} = \alpha * BLE_2\_EWA_{BLE2\_Cnt-1} + (1-\alpha) RSS_{BLE2\_Cnt} \quad (EQ.\ 2)$$

where $BLE_2\_EWA_{BLE2\_Cnt-1}$ may correspond to a previous expected weighted average of previously measured strength values at the transceiver 22b and $RSS_{BLE2\_Cnt}$ corresponds to the most recent signal strength of the received signal at the transceiver 22b.

In operation 110, the controller 32 determines whether the signal SCAN_REQ was received at the transceiver 22c from the OCD 16. If this condition is true, then the method 60 moves to operation 112. If not, then the method 60 moves to operation 122.

In operation 112, the controller 32 increments the count for $BLE_3\_Cnt$. It is recognized that the controller 32 measures the signal strength of the signal at the transceiver 22c to generate a count if the controller 32 has not received a signal from the OCD 16, or to increment a previous count if the controller 32 detects that it has received a previous signal from the OCD 16.

In operation 114, the controller 32 compares the incremented count to $BLE_3\_Cnt$ to determine if the overall count has exceeded the predefined threshold. Again, it is desirable to have enough samples before calculating the EWA for the transceiver 22c. If this condition is true, then the method 60 proceeds to operation 120. If not, then the method 60 proceeds to operation 116.

In operation 116, the controller 32 uses the latest received sample (e.g., $RSS_{BLE3\_Cnt}$) to determine the received signal strength $BLE_3\_RSS_{total}$ at the transceiver 22c.

In operation 118, the controller 32 calculates an initial EWA (i.e., a simple mean) (e.g., $(BLE_3\_EWA_{BLE3\_Cnt})$ for the transceiver 22c based on the received signal strength $BLE_3\_RSS_{total}$ and on the count $BLE_3\_Cnt$.

In operation 120, the controller 32 calculates a third EWA (e.g., $(BLE_3\_EWA_{BLE3\_Cnt})$ for the transceiver 22c after determining that the incremented count $BLE_{3\_Cnt}$ exceeds the predefined threshold (see operation 114). The third EWA as calculated in operation 120 differs from the initial EWA in that the initial EWA was based on a count that is not greater than the predefined threshold. Thus, because the third EWA is based on a sufficient number of samples, this value may have a higher confidence rate than the initial EWA. In general, the controller 32 applies a low pass filter based on:

$$BLE_3\_EWA_{BLE3\_Cnt} = \alpha * BLE_3\_EWA_{BLE3\_Cnt-1} + (1-\alpha) RSS_{BLE3\_Cnt} \quad (EQ.\ 3)$$

where $BLE_3\_EWA_{BLE3\_Cnt-1}$ may correspond to a previous expected weighted average of previously measured strength values at the transceiver 22c and $RSS_{BLE3\_Cnt}$ corresponds to the most recent signal strength of the received signal at the transceiver 22c.

In operation 122, the controller 32 compares each incremented count (e.g., from each transceiver 22a-22c) to $BLE_{2\_Cnt}$, $BLE_{2\_Cnt}$, and $BLE_{3\_Cnt}$ to the predefined threshold, k. In this case, it is desirable to have a sufficient number of samples prior to determining the location of the OCD 16. If this condition is true, then the method 60 moves to operation 124. If not, then the method 60 moves to operation 132.

In operation 132, the controller 32 transmits on the signal SCAN_RSP that the location of the OCD 16 is indeterminate and the method 60 proceeds back to operation 80.

In operation 124, the controller 32 compares the values for the first EWA (e.g., $(BLE_1\_EWA_{BLE1\_Cnt})$) and the second EWA (e.g., $(BLE_2\_EWA_{BLE2\_Cnt})$). For example, the controller 32 determines whether:

$$BLE_2\_EWA_{BLE2\_Cnt} - BLE_1\_EWA_{BLE1\_Cnt} \geq t_1$$

where $t_1$ corresponds to a first threshold value.

If this condition is true, then the method 60 proceeds to operation 134. If not, then the method 60 proceeds to operation 126.

In operation 134, the controller 32 transmits on the signal SCAN_RSP that the OCD 16 is located in a passenger zone 20b and the method 60 proceeds back to operation 80.

In operation 126, the controller 32 compares the first EWA (e.g., $BLE_1\_EWA_{BLE1\_Cnt}$) to the third EWA (e.g., $(BLE_3\_EWA_{BLE3\_Cnt})$). For example, the controller 32 determines whether:

$$BLE_3\_EWA_{BLE3\_Cnt} - BLE_1\_EWA_{BLE1\_Cnt} \geq t_2$$

where $t_2$ corresponds to a second threshold value.

If this condition is true, then the method 60 proceeds to operation 134. If not, then the method 60 proceeds to operation 128.

In operation 128, the controller 32 determines whether:

$$BLE_t\_EWA_{BLE1\_Cnt} \geq t_3$$

where $t_3$ corresponds to a third threshold value.

If this condition is true, then the method 60 proceeds to operation 130. If not, then the method 60 proceeds to operation 132.

In operation 130, the controller 32 transmits on the signal SCAN_RSP that the OCD 16 is located in a driver zone 20a and the method 60 proceeds back to operation 80.

Figure 6A:
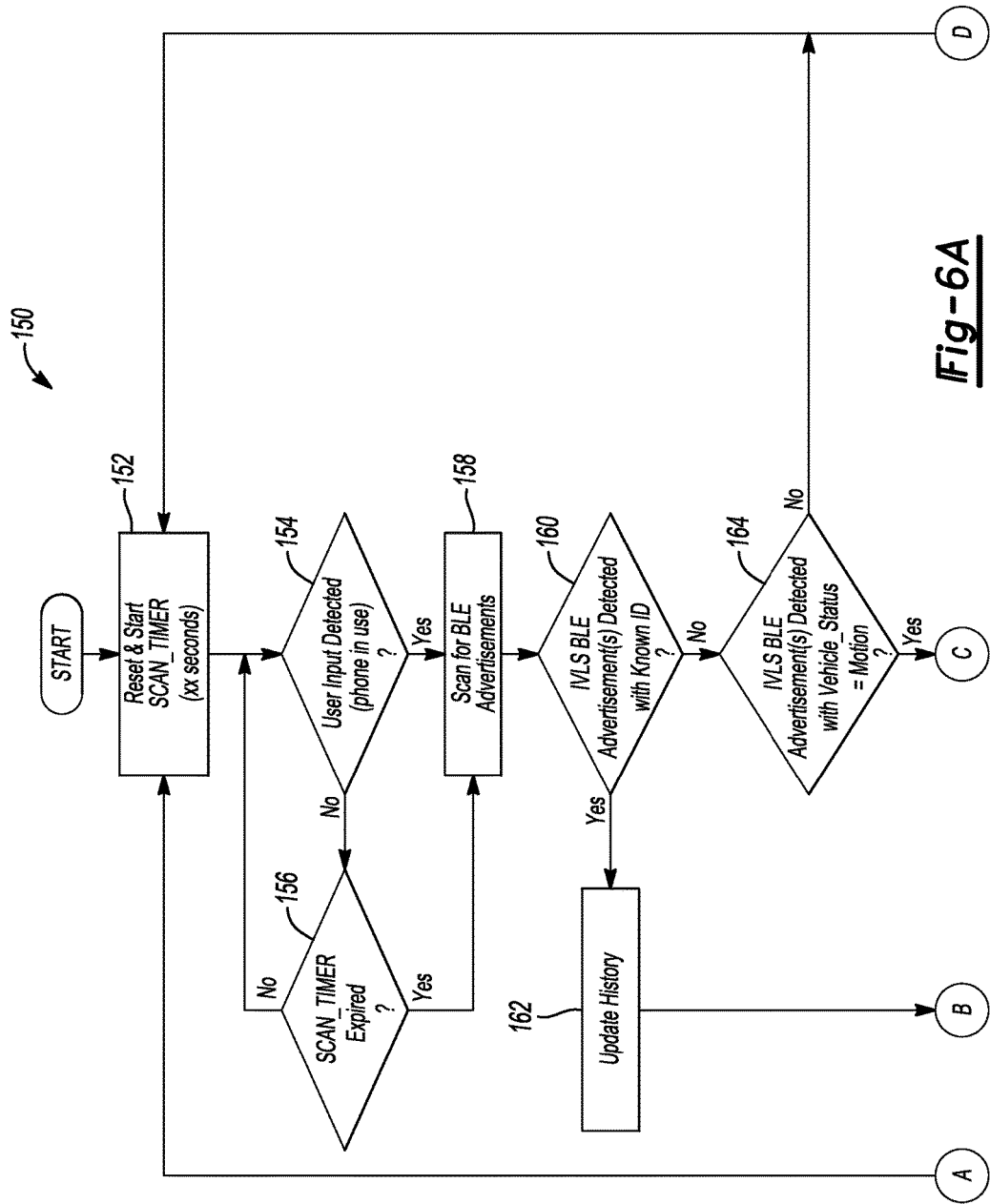
FIGS. 6a-6c depict a method for determining the location of the OCDs also utilizing the apparatus of FIG. 3 in accordance to one embodiment.
Figure 6B:
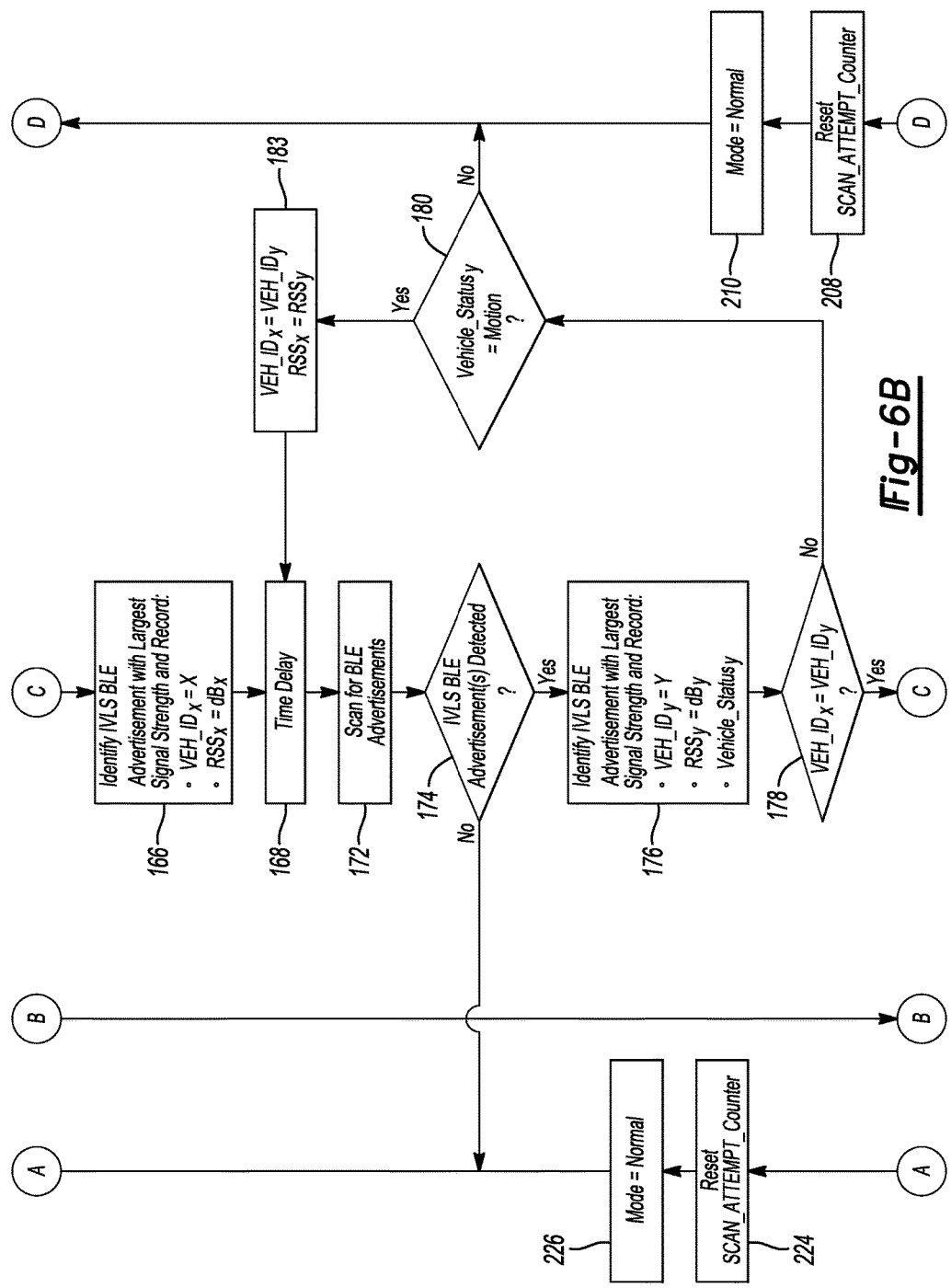
Figure 6C:
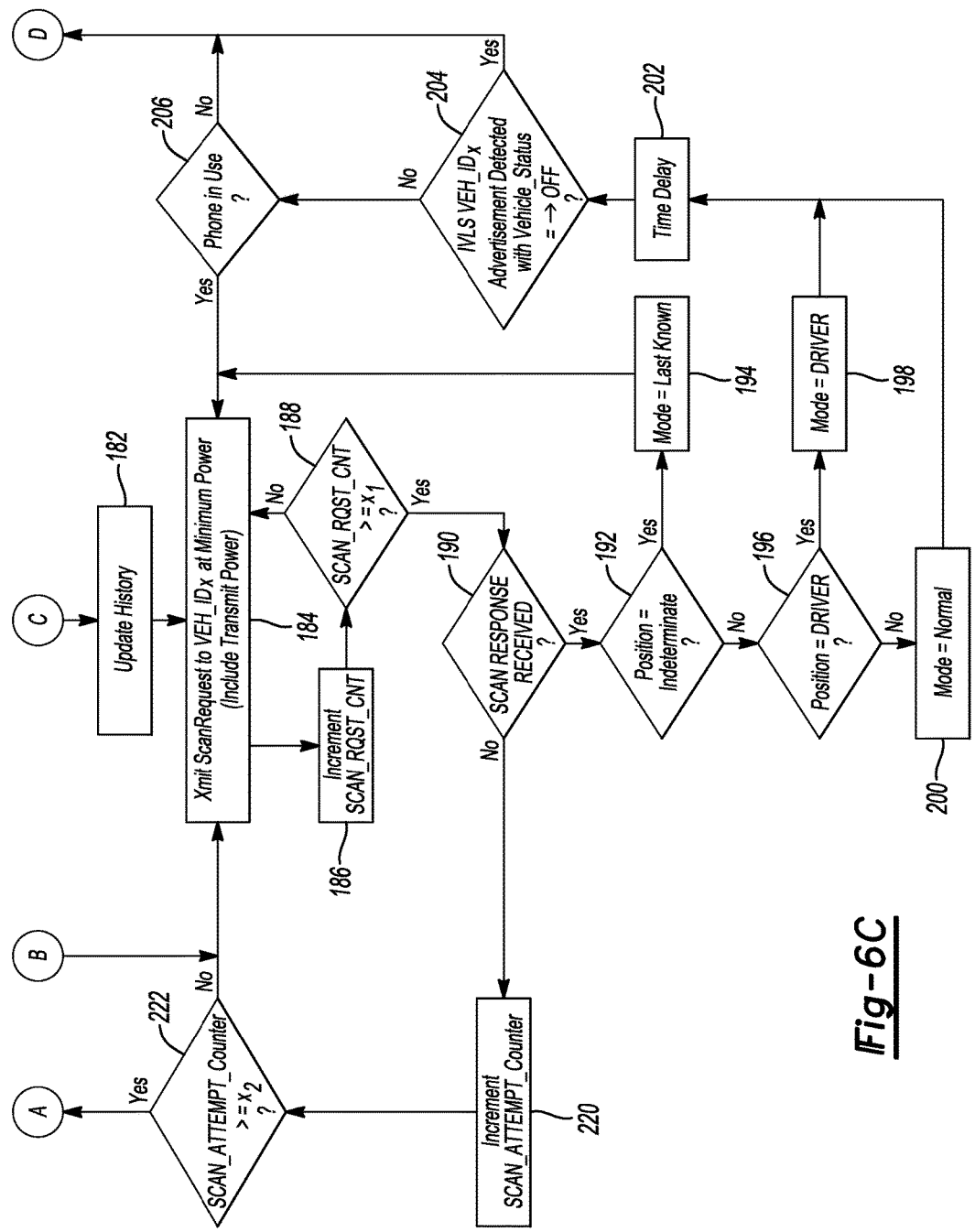

FIGS. 6a-6c depict a method 150 for determining the location of the OCD(s) 16 also utilizing the apparatus 30 of FIG. 3 in accordance to one embodiment. The method 150 generally illustrates various operations executed in connection with the OCD 16 in FIG. 3.

In operation 152, the OCD 16 initiates a timer.

In operation 154, the OCD 16 determines whether it is being used by a user. For example, the OCD 16 determines whether it is receiving a command to perform a task from a user (e.g., touch input, physically moving about a cabin of the vehicle 18, etc.). If this condition is not true, then the method 150 moves to operation 156. If so, then the method 150 moves to operation 158.

In operation 156, the OCD 16 determines whether the timer has expired if a user input was not received. If the timer has not expired, then the method 150 moves back to operation 154. If so, then the method 150 moves to operation 158.

In operation 158, the OCD 16 monitors for the signal ADV from each transceiver 22 the vehicle 18.

In operation 160, the OCD 16 determines whether the signal(s) ADV as received from the transceivers 22 include a known identification of the advertiser (or controller 32 and/or transceiver 22) (e.g., the BLE ID (a unique ID assigned to all BLE devices per Bluetooth specifications). If this condition is true, then the method 150 moves to operation 162. If not, then the method 150 moves to operation 164.

In operation 162, the OCD 16 updates its history (i.e., updates the history of known IVLS advertisements) and moves to operation 184 which will be described in more detail below.

In operation 164, the OCD 16 determines whether the vehicle 18 is in motion (e.g., in the driver mode) based on the signal ADV. If this condition is true, then the method 150 moves to operation 166. If not, then the method 150 moves back to operation 152.

In operation 166, the OCD 16 identifies which signal ADV from the vehicle 18 (or controller 32) exhibits a first largest signal strength when received at the OCD 16. In this operation, the transceiver 22 that transmits the signal ADV at the largest signal strength is set to VEH_ID$_x$.

In operation 168, the OCD 16 implements a time delay.

In operation 172, the OCD 16 monitors for the signal ADV from each transceiver 22 the vehicle 18. The OCD 16 is attempting to correlate to a vehicle 18.

In operation 174, the OCD 16 determines whether the signal(s) ADV as received from the transceivers 22 include a known identification of the advertiser (or controller 32 and/or transceiver 22) (e.g., the BLE ID (a unique ID assigned to all BLE devices per Bluetooth specifications). If this condition is true, then the method 150 moves to operation 176. If not, then the method 150 moves to operation 152.

In operation 176, the OCD 16 again identifies which signal ADV from the corresponding vehicle 18 (or controller 32) exhibit a second largest signal strength when received at the OCD 16. In this operation, the transceiver 22 that transmits the signal ADV at the largest signal strength is set to VEH_ID$_y$.

In operation 178, the OCD 16 compares VEH_ID$_x$ (see operation 166 above) to VEH_ID$_y$ to determine if they are equal to one another. If this condition is not true, then the method 150 proceeds to operation 180. If this condition is true, the method 150 proceeds to operation 182 which indicates that the advertisements received at the OCD 16 are from the same vehicle 18.

In operation 180, the OCD 16 determines whether the vehicle 18 is in motion (e.g., in the driver mode) based on the signal ADV as received in operation 174. If this condition is true, then the method 150 moves to operation 183. If not, then the method 150 moves back to operation 152.

In operation 183, the OCD 16 sets the VEH_ID$_x$ to the VEH_ID$_y$ and the method 150 proceeds back to operation 168.

In operation 182, the OCD 16 updates its history of known vehicles.

In operation 184, the OCD 16 transmits the signal SCAN_REQ at a low power level to the transceivers 22 to create a signal strength disparity at the transceivers 22. The signal SCAN_REQ may also include the power at which the OCD 16 transmitted the signal SCAN_REQ. This enables the calculation of the attenuation. It is recognized that the OCD 16 can transmit a burst of the signals SCAN_REQ.

In operation 186, the OCD 16 increments a counter corresponding to each transmission of the signal SCN_REQ.

In operation 188, the OCD 16 determines whether the counter of operation 186 has exceeded a first predetermined counter value. If this condition is true, then the method 150 moves to operation 190. If not, then the method 150 moves to operation 188. Operation 188 generally corresponds to the condition in which the OCD 16 is configured to transmit the signal SCAN_REQ on multiple occasions (e.g., in a burst) to ensure receipt and to ensure enough sample have been received at the transceivers 22.

In operation 190, the OCD 16 determines whether the signal SCAN_RSP has been received (i.e., from the transceivers 22 (or the controller 32)). If this condition is true, then the method 150 moves to operation 192. If not, then the method 150 moves to operation 220 where the OCD 16 increases a scan attempt counter and to operation 222 where the OCD 16 compares the scan attempt counter to a second predetermined counter value to determine if all transmissions of the signal SCAN_REQ where transmitted with no subsequent reception at the vehicle 18.

In operation 224, the OCD 16 resets the scan attempt counter when the scan attempt counter is determined to exceed the second predetermined counter value. Thereafter, in operation 226, the OCD 16 will operate in the normal mode as it can be implied that the OCD 16 has left the vehicle 18.

In operation 192, the OCD 16 determines whether the signal SCAN_RSP indicates that the position of the OCD 16 is indeterminate. If this condition is true, then the method 150 moves to operation 194. If not, then the method 150 moves to operation 196.

In operation 194, the OCD 16 uses the last known location that was received on a previous transmission of the signal SCAN_RSP.

In operation 196, the OCD 16 determines whether the signal SCAN_RSP indicates that the position of the OCD 16 is in the driver zone 20a. If this condition is true, then the method 150 moves to operation 198. If not, then the method 150 moves to operation 200.

In operation 198, the OCD 16 detects that it is located in the driver zone 20a and may reduce functionality to reduce driver distraction.

In operation 202, the OCD 16 implements a time delay to reduce battery consumption and/or to periodically check location during use by the user.

In operation 204, the OCD 16 monitors the signal ADV as received from the vehicle 18 to determine if the ignition status has transitioned from ON to OFF. If this condition is true, then the method 150 proceeds to operation 208 and the OCD 16 resets a scan attempt counter (see operation 208) and enters into a normal mode where there are no restrictions in place. It is recognized that if this condition is true, this will serve as an interrupt the OCD 16. When the ignition switch transitions to OFF, the OCD 16 immediately returns to normal operation upon receiving this condition as an advertisement.

In operation 206, the OCD 16 determines whether it is being used by the user. If so, then the method 150 moves back to operation 184. If not, then the method 105 moves to operation 208.

Figure 7:
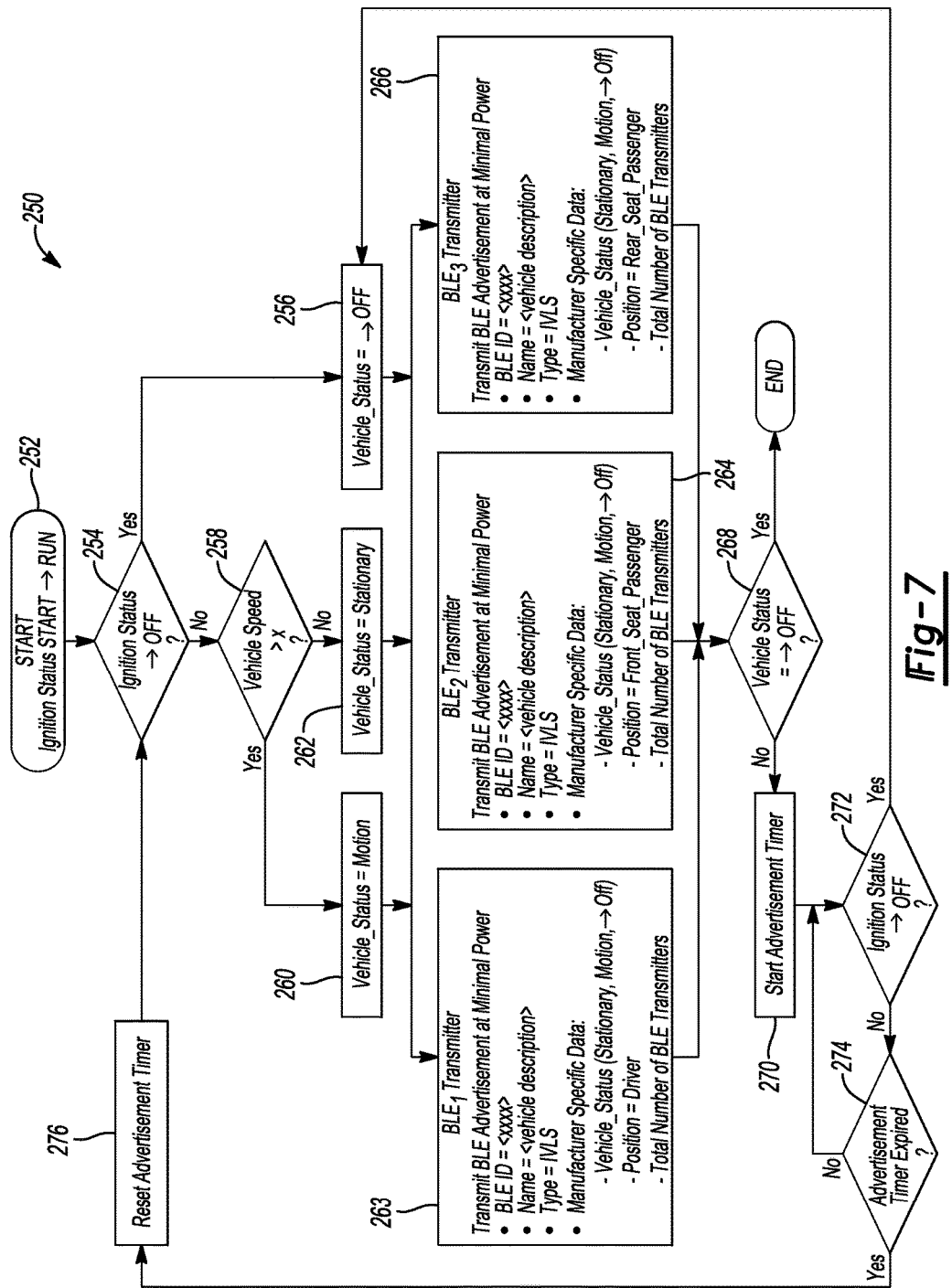
FIG. 7 depicts a method for determining the location of the OCDs utilizing the apparatus of FIG. 4 in accordance to one embodiment.

FIG. 7 depicts a method 250 for determining the location of the OCD(s) 16 utilizing the apparatus 50 of FIG. 4 in accordance to one embodiment. The method 250 generally illustrates various operations executed in connection with the controller 32 in FIG. 4.

In operation 252, the controller 32 receives a signal from a body control module (not shown) in the vehicle 18 that indicates that an ignition switch (also not shown) is in a "RUN" position.

In operation 254, the controller 32 determines whether ignition status for the ignition switch has transitioned to an "OFF" state. If this condition is true, then the method 250 proceeds to operation 256. In not, then the method 250 proceeds to operation 258.

In operation 256, the controller 32 may shut down in response to determining that the ignition status has transitioned to the "OFF" state. The controller 32 provides an indication of the vehicle shutting down on the signal ADV (e.g., vehicle status).

In operation 258, the controller 32 determines whether the vehicle 18 is moving based on information provided by the PCM 34 (e.g., vehicle status (vehicle speed >x or transmission status=R, D, L). If this condition is true, then the method 250 proceeds to operation 260. If not, then the method 250 proceeds to operation 262.

In operation 260, the controller 32 determines that the vehicle 18 is in motion and transmits the vehicle status on the signal ADV as indicating that the vehicle 18 is in motion.

In operation 263, the controller 32 transmits the signal ADV at a low power which indicates the BLE ID for the controller 32. The signal ADV includes the vehicle status which indicates whether the vehicle 18 is stationary, in motion, or has switched OFF. The signal ADV also indicates that the vehicle 18 is in motion and further provides information corresponding to which zone 20 (e.g., zone 20a, 20b, and 20c) the transceiver 22 is positioned in and the total number of transceivers 22 in the vehicle 18.

In operation 264, the controller 32 transmits the signal ADV at a low power which indicates the BLE ID for the controller 32. The signal ADV includes the vehicle status which indicates whether the vehicle 18 is stationary, in motion, or has switched OFF. The signal ADV also indicates that the vehicle 18 is in motion and further provides information corresponding to which zone 20 (e.g., zone 20a, 20b, and 20c) the transceiver 22 is positioned in and the total number of transceivers 22 in the vehicle 18.

In operation 266, the controller 32 transmits the signal ADV at a low power which indicates the BLE ID for the controller 32. The signal ADV includes the vehicle status which indicates whether the vehicle 18 is stationary, in motion, or has switched OFF. The signal ADV also indicates that the vehicle 18 is in motion and further provides information corresponding to which zone 20 (e.g., zone 20a, 20b, and 20c) the transceiver 22 is positioned in and the total number of transceivers 22 in the vehicle 18.

In operation 268, the controller 32 determines whether ignition status for the ignition switch has transitioned to an "OFF" state. If this condition is true, then the method 250 ends. If not, then the method 250 proceeds to operation 270.

In operation 270, the controller 32 initiates a timer for transmitting the signal ADV. This may set the periodic rate of the transmission of the advertisements.

In operation 272, the controller 32 determines whether ignition status for the ignition switch has transitioned to an "OFF" state. If this condition is true, then the method 250 proceeds to operation 256. If not, then the method 250 proceeds to operation 274.

In operation 274, the controller 32 determines whether the timer has expired. If this condition is true, then the method 250 moves to operation 276. If not, then the method 250 moves to operation 272.

In operation 276, the controller 32 resets the timer and proceeds back to operation 254.

Figure 8A:
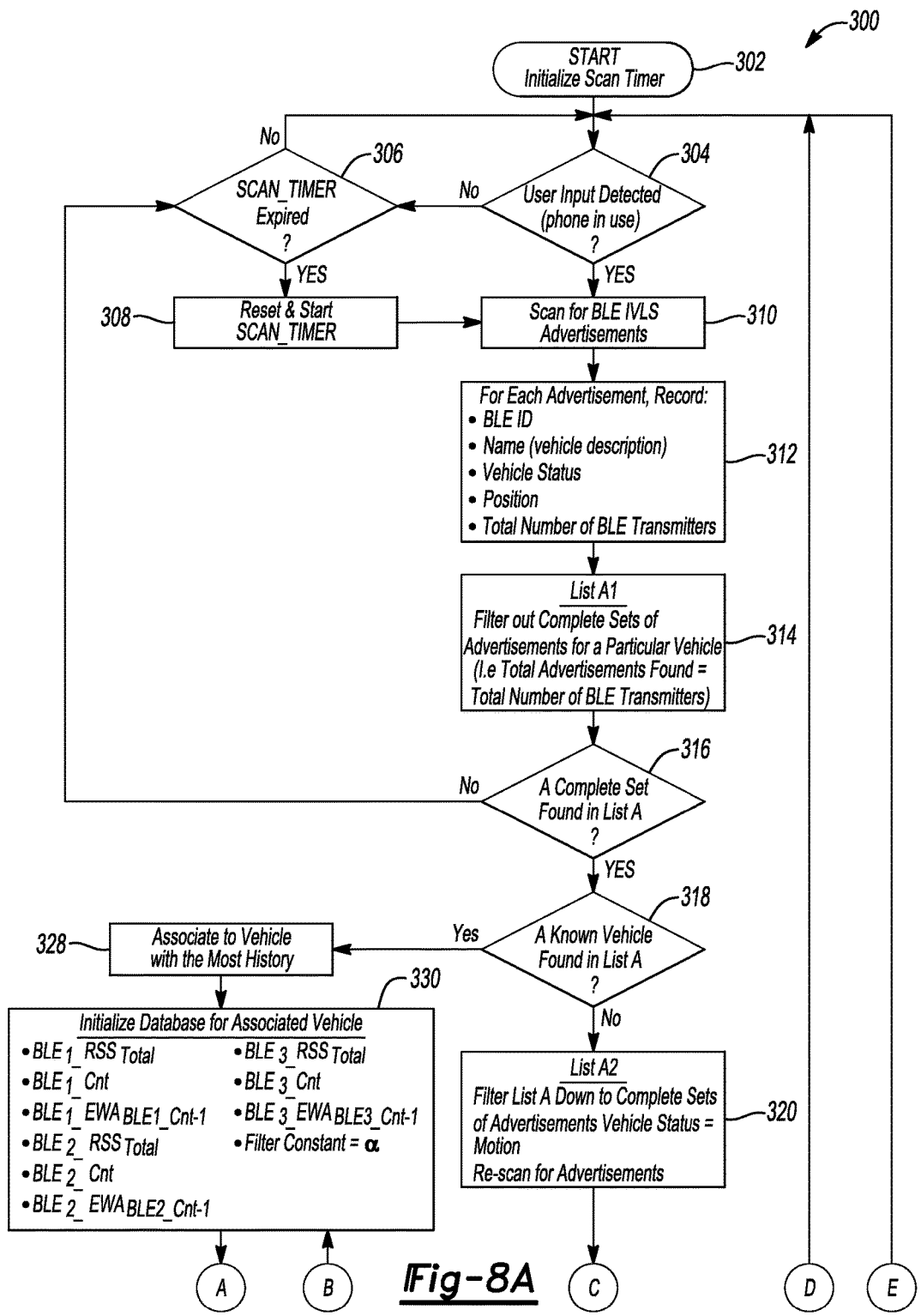
FIGS. 8a-8c depict a method for determining the location of the OCDs utilizing the apparatus of FIG. 4 in accordance to one embodiment.
Figure 8B:
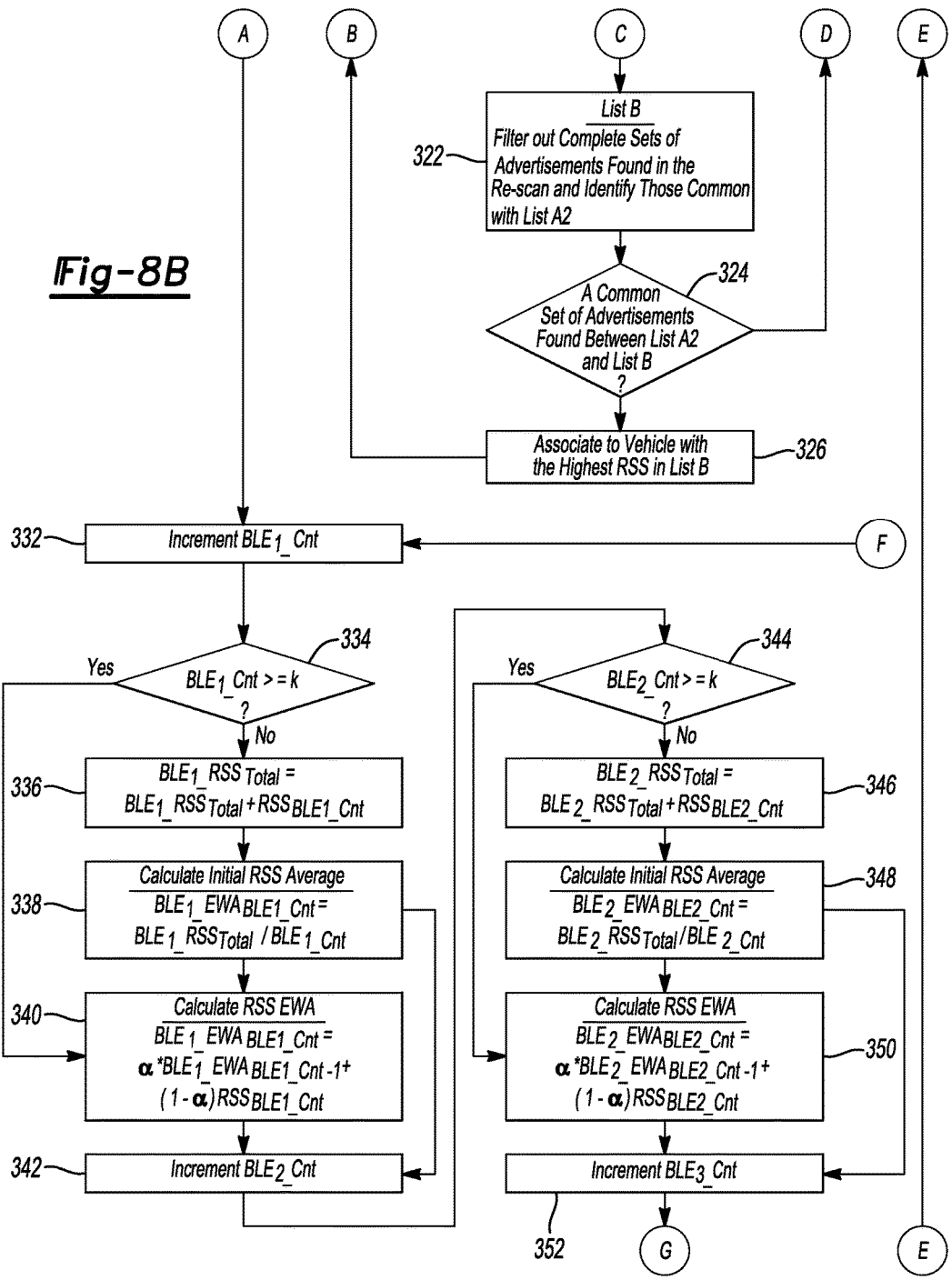
Figure 8C:
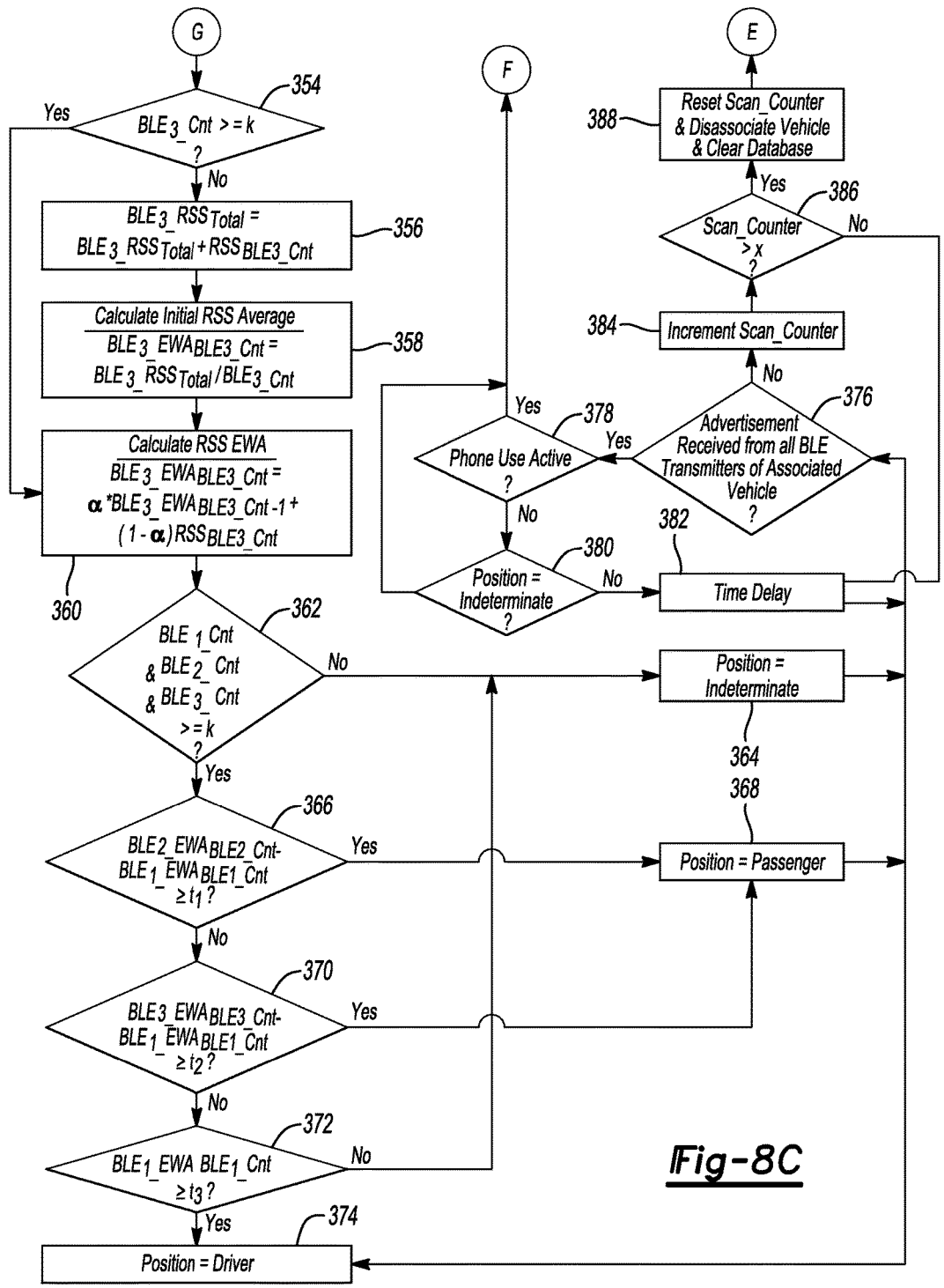

FIGS. 8a-8c depict a method 300 for determining the location of the OCD(s) 16 utilizing the apparatus 50 of FIG. 4 in accordance to one embodiment. The method 300 generally illustrates various operations executed in connection with the OCD 16 in FIG. 4.

In operation 302, the OCD 16 initializes a scan timer to detect when a user provides an input to use the OCD 16.

In operation 304, the OCD 16 determines whether it is being used by a user. For example, the OCD 16 determines whether it is receiving a command to perform a task from a user (e.g., touch input, physically moving about a cabin of the vehicle 18, etc.). If this condition is not true, then the method 300 moves to operation 306. If so, then the method 300 moves to operation 310.

In operation 306, the OCD 16 determines whether the scan timer has expired if a user input was not received. If the timer has not expired, then the OCD 16 moves back to operation 304. If so, then the method 300 moves back to operation 308.

In operation 308, the OCD 16 resets or restarts the scan timer.

In operation 310, the OCD 16 monitors for the signal ADV from each transceiver 22 the vehicle 18.

In operation 312, the OCD 16 stores data corresponding to the identification of the advertiser (or controller 32 and/or transceiver 22) (e.g., the BLE ID (a unique ID assigned to all BLE devices per Bluetooth specifications)), the name of the vehicle 18, vehicle status (e.g., motion, stationary, or transition to OFF), and a total number of transceivers 22 in the vehicle 18) from the signal ADV.

In operation 314, the OCD 16 filters out and stores information corresponding to the name of the vehicle 18 in a List A which includes information received as indicated in operation 312. In other words, the OCD 16 focuses on the vehicle that is most identified in the advertisement signals (e.g., the signal ADV) from the vehicle 18.

In operation 316, the OCD 16 determines whether a complete list is found in List A. If not, then the method 300 moves to operation 306. If so, then the method 300 moves to operation 318.

In operation 318, the OCD 16 determines whether a known vehicle 18 has been found. For example, the OCD 16 determines whether it has received the signal ADV previously from the vehicle 18 from a previous ignition cycle (i.e., whether the OCD 16 has electrically communicated with the vehicle 18 in the past). If this condition is not true, then the method 300 moves to operation 322. If the condition is true, then the method 300 moves to operation 328.

In operation 320, the OCD 16 filters out information that indicates that the vehicle 18 is in motion and then initiates another scan to help determine if it is in the vehicle 18. Or, the OCD 16 filters List A down to complete sets of advertisements when the vehicle status indicates that the vehicle 18 is in motion.

In operation 322, the OCD 16 filters complete sets of advertisements found in the re-scan and identifies those that are in common with List A2.

In operation 324, the OCD 16 determines whether a common set of advertisements were found between List A2 and B. If this condition is true, then the method 300 proceeds to 326. If not, then the method 300 proceeds back to operation 304.

In operation 326, the OCD 16 associates itself to the vehicle with the highest signal strength in List B.

In operation 328, the OCD 16 associates itself to the vehicle 18 that has the highest degree of history with the OCD 16.

In operation 330, the OCD 16 initiates the process for retrieving data for the received signal strength (or ($BLE_1\_RSS_{total}$), ($BLE_2\_RSS$) and ($BLE_3\_RSS_{total}$), the count for each signal strength measurement (or ($BLE_1\_Cnt$), ($BLE_2\_Cnt$), and ($BLE_3\_Cnt$)), and the ETA (or ($BLE_1\_EWA_{BLE1\_Cnt}$), ($BLE_2\_EWA_{BLE2\_Cnt}$), ($BLE_3\_EWA_{BLE3\_Cnt}$) for the OCD 16 that has a history with the vehicle 18.

In operation 332, the OCD 16 increments the count for $BLE_1\_Cnt$. It is recognized that the OCD 16 obtains the signal strength of the signal at the transceiver 22a to generate a count if the OCD 16 has not received a signal from the vehicle 18, or to increment a previous count if the OCD 16 detects that it has received a previous signal from the vehicle 18.

In operation 334, the OCD 16 compares the incremented count to $BLE_1\_Cnt$ to determine if the overall count has exceeded a predefined threshold. In this case, it is desirable to have enough samples before calculating the EWA for the transceiver 22a. If this condition is true, then the method 300 proceeds to operation 340. If not, then the method 300 proceeds to operation 336.

In operation 336, the OCD 16 uses the latest received sample (e.g., $RSS_{BLE1\_Cnt}$) to determine the signal strength $BLE_1\_RSS_{total}$ at the transceiver 22a. This is basically the sum of all samples.

In operation 338, the OCD 16 an initial EWA (i.e., a simple mean) (e.g., ($BLE_1\_EWA_{BLE1\_Cnt}$) for the transceiver 22a based on the received signal strength $BLE_1\_RSS_{total}$ and on the count $BLE_1\_Cnt$.

In operation 340, the OCD 16 calculates a first EWA (e.g., ($BLE_1\_EWA_{BLE1\_Cnt}$) for the transceiver 22a after determining that the incremented count $BLE_1\_Cnt$ exceeds the predefined threshold (see operation 334). The first EWA as calculated in operation 340 differs from the initial EWA in that the initial EWA was based on a count that is not greater than the predefined threshold. Thus, because the first EWA is based on a sufficient number of samples, this value may have a higher confidence rate than the initial EWA. In general, the OCD 16 applies a low pass filter based on:

$$BLE_1\_EWA_{BLE1\_Cnt} = \alpha * BLE_1\_EWA_{BLE1\_Cnt-1} + (1-\alpha) RSS_{BLE1\_Cnt} \quad (EQ.\ 4)$$

where $BLE_1\_EWA_{BLE1\_Cnt-1}$ may correspond to a previous expected weighted average of previously measured strength values and $RSS_{BLE2\_Cnt}$ corresponds to the most recent signal strength.

In operation 342, the OCD 16 increments the count for $BLE_2\_Cnt$. It is recognized that the OCD 16 obtains the signal strength of the signal at the transceiver 22b to generate a count if the OCD 16 has not received a signal from the vehicle 18, or to increment a previous count if the OCD 16 detects that it has received a previous signal from the vehicle 18.

In operation 344, the OCD 16 compares the incremented count to $BLE_2\_Cnt$ to determine if the overall count has exceeded the predefined threshold. Again, it is desirable to have enough samples before calculating the EWA for the transceiver 22b. If this condition is true, then the method 300 proceeds to operation 350. If not, then the method 300 proceeds to operation 346.

In operation 346, the OCD 16 uses the latest sample (e.g., $RSS_{BLE2\_Cnt}$) to determine the received signal strength $BLE_2\_RSS_{total}$ at the transceiver 22b. This is basically the sum of all samples.

In operation 348, the OCD 16 calculates an initial EWA (i.e., a simple mean) (e.g., ($BLE_2\_EWA_{BLE2\_Cnt}$) for the transceiver 22b based on the received signal strength $BLE_2\_RSS_{total}$ and on the count $BLE_2\_Cnt$.

In operation 350, the OCD 16 calculates a second EWA (e.g., ($BLE_2\_EWA_{BLE2\_Cnt}$) for the transceiver 22b after determining that the incremented count $BLE_2\_Cnt$ exceeds the predefined threshold (see operation 344). The second EWA as calculated in operation 350 differs from the initial EWA in that the initial EWA was based on a count that is not greater than the predefined threshold. Thus, because the second EWA is based on a sufficient number of samples, this value may have a higher confidence rate than the initial EWA. In general, the OCD 16 applies a low pass filter based on:

$$BLE_2\_EWA_{BLE2\_Cnt} = \alpha * BLE_2\_EWA_{BLE2\_Cnt-1} + (1-\alpha) RSS_{BLE2\_Cnt} \quad (EQ.\ 5)$$

where $BLE_2\_EWA_{BLE2\_Cnt-1}$ may correspond to a previous expected weighted average of previously measured strength values and $RSS_{BLE2\_Cnt}$ corresponds to the most recent signal strength.

In operation 352, the OCD 16 increments the count for $BLE_3\_Cnt$. It is recognized that the OCD 16 obtains the signal strength of the signal at the transceiver 22c to generate a count if the OCD 16 has not received a signal from the vehicle 18, or to increment a previous count if the OCD 16 detects that it has received a previous signal from the vehicle 18.

In operation 354, the OCD 16 compares the incremented count to $BLE_3\_Cnt$ to determine if the overall count has exceeded the predefined threshold. Again, it is desirable to have enough samples before calculating the EWA for the transceiver 22c. If this condition is true, then the method 300 proceeds to operation 360. If not, then the method 300 proceeds to operation 356.

In operation 356, the OCD 16 uses the latest sample (e.g., $RSS_{BLE3\_Cnt}$) to determine the received signal strength $BLE_3\_RSS_{total}$ at the transceiver 22c. This is basically the sum of all samples.

In operation 358, the OCD 16 calculates an initial EWA (i.e., a simple mean) (e.g., ($BLE_3\_EWA_{BLE3\_Cnt}$) for the transceiver 22c based on the received signal strength $BLE_3\_RSS_{total}$ and on the count $BLE_3\_Cnt$.

In operation 360, the OCD 16 calculates a third EWA (e.g., ($BLE_2\_EWA_{BLE2\_Cnt}$) for the transceiver 22c after determining that the incremented count $BLE_3\_Cnt$ exceeds the predefined threshold. The third EWA as calculated in operation 360 differs from the initial EWA in that the initial EWA was based on a count that is not greater than the predefined threshold. Thus, because the third EWA is based on a sufficient number of samples, this value may have a higher confidence rate than the initial EWA. In general, the OCD 16 applies a low pass filter based on:

$$BLE_3\_EWA_{BLE3\_Cnt} = \alpha * BLE_3\_EWA_{BLE3\_Cnt-1} + (1-\alpha) RSS_{BLE3\_Cnt} \quad (EQ.\ 6)$$

where $BLE_3\_EWA_{BLE1\_Cnt-1}$ may correspond to a previous expected weighted average of previously measured strength values and $RSS_{BLE3\_Cnt}$ corresponds to the most recent signal strength.

In operation 362, the OCD 16 compares each incremented count, for example, $BLE_1\_Cnt$, $BLE_2\_Cnt$, and $BLE_3\_Cnt$ to the predefined threshold, k. In this case, it is desirable to have a sufficient number of samples prior to determining the location for the OCD 16. If this condition is true, then the method 300 moves to operation 366. If not, then the method 300 moves to operation 364.

In operation 364, the OCD 16 determines that is position in the vehicle 18 is indeterminate and then proceeds to operation 396.

In operation 366, the OCD 16 compares the values for the first EWA (e.g., ($BLE_1\_EWA_{BLE1\_Cnt}$)) and the second EWA (e.g., ($BLE_2\_EWA_{BLE2\_Cnt}$)). For example, the OCD 16 determines whether:

$$BLE_2\_EWA_{BLE2\_Cnt} - BLE_1\_EWA_{BLE1\_Cnt} \geq t_1$$

where $t_1$ corresponds to a first threshold value.

If this condition is true, then the method 300 proceeds to operation 368. If not, then the method 300 proceeds to operation 370.

In operation 368, the OCD 16 determines that it is positioned in the zone 20b (i.e., in the front passenger zone).

In operation 370, the OCD 16 compares the first EWA (e.g., $BLE_1\_EWA_{BLE1\_Cnt}$) to the third EWA (e.g., ($BLE_3\_EWA_{BLE3\_Cnt}$)). For example, the OCD 16 determines whether:

$$BLE_3\_EWA_{BLE3\_Cnt} - BLE_1\_EWA_{BLE1\_Cnt} > t_2$$

where $t_2$ corresponds to a second threshold value.

If this condition is true, then the method 300 proceeds to operation 368. If not, then the method 300 proceeds to operation 372.

In operation 368, the OCD 16 determines that is in the zone 20c (i.e., in the rear passenger zone).

In operation 372, the controller 32 determines whether:

$$BLE_1\_EWA_{BLE1\_Cnt} > t_3$$

where $t_3$ corresponds to a third threshold value.

If this condition is true, then the method 300 proceeds to operation 374. If not, then the method 300 proceeds to operation 364.

In operation 374, the OCD 16 determines that it is in the zone 20a (i.e., in the driver zone). In this case, the OCD 16 could restrict functionality if it is also determined that the vehicle 18 is in motion.

In operation 376, the OCD 16 determines whether it has received the signal ADV from all of the transceivers 22 in the vehicle 18. If this condition is true, then the method 300 moves to operation 378. If not, then the method 300 moves to operation 384.

In operation 384, the scan counter is compared to a value. If the scan counter is greater than the value, then the method 300 moves to operation 388. If not, then the method 300 moves to operation 382.

In operation 388, the OCD 16 compares a scan counter to a predetermined value and resets the scan counter to disassociate itself from the vehicle 18 as noted in operation 388.

In operation 382, the OCD 16 incorporates a time delay.

In operation 378, the OCD 16 determines whether the OCD 16 is active (e.g., being used by a driver such as manual operation or some other operation thereon that could cause a distraction). In this case, the OCD 16 may restrict functionality to mitigate the potential for a distraction to occur if this condition is true. The method 300 then moves back to operation 332. If the condition of operation 378 is not true, then the method 300 moves to operation 380. From there, the method 300 will move to operation 332 or 382.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
a controller electrically coupled to a plurality of transceivers within a vehicle for enabling bi-directional wireless communication between the controller and an occupant communication device (OCD), the controller being configured to:
transmit an advertisement signal indicative of the vehicle being in motion from each transceiver to the OCD;
receive, at each transceiver, a request signal from the OCD at a first power level;
determine a location of the OCD in the vehicle in response to receiving the request signal at each transceiver at the first power level;
transmit a response signal indicative of the location of the OCD in the vehicle to the OCD;
measure a signal strength of the first power level of the request signal at a first transceiver to provide a first measured signal strength; and
increment a first count in response to measuring the signal strength at the first transceiver prior to determining the location of the OCD.

2. The apparatus of claim 1 wherein the first transceiver is positioned in a driver zone of the vehicle and at least one second transceiver is positioned in a passenger zone of the vehicle.

3. The apparatus of claim 2 wherein the controller is further configured to transmit the response signal to indicate whether the OCD is located in one of the driver zone, the passenger zone, and an indeterminate position within the vehicle.

4. The apparatus of claim 2 wherein the controller is further configured to compare the first count to a first predefined threshold prior to determining the location of the OCD in the vehicle.

5. The apparatus of claim 4 wherein the controller includes a filter that is configured to determine a first exponentially weighted average of the first measured signal strength and a first previous exponentially weighted average of first previously measured signal strength values at the first transceiver in response to the first count being greater than the first predefined threshold.

6. The apparatus of claim 5 wherein the controller is further configured to compare the first exponentially weighted average to a first threshold value and to determine that the OCD is in the driver zone in response to the first exponentially weighted average being greater than a first threshold value.

7. The apparatus of claim 5 wherein:
the controller is further configured to:
measure a signal strength of the first power level of the request signal at the at least one second transceiver to provide a second measured signal strength; and
increment a second count in response to measuring the signal strength at the at least one second transceiver.

8. The apparatus of claim 7 wherein the controller is further configured to compare the second count to a second predefined threshold prior to determining the location of the OCD in the vehicle.

9. The apparatus of claim 8 wherein the controller includes a filter that is configured to determine a second exponentially weighted average of the second measured signal strength and a second previous exponentially weighted average of second previously measured signal strength values at the at least one second transceiver in response to the second count being greater than the second predefined threshold.

10. The apparatus of claim 9 wherein the controller is further configured to take a difference between the second exponentially weighted average and the first exponentially weighted average to generate a difference exponentially weighted average and to compare the difference exponentially weighted average to a second threshold value.

11. The apparatus of claim 10 wherein the controller is further configured to determine that the OCD is in the passenger zone in response to the difference exponentially weighted average being greater than the second threshold value.

12. A method for locating an occupant communication device in a vehicle, the method comprising:
   communicating between a plurality of transceivers in a vehicle and an occupant communication device (OCD);
   transmitting an advertisement signal indicative of the vehicle being in motion from each transceiver to the OCD;
   receiving, at each transceiver, a scan request signal from the OCD at a first power level;
   determining a location of the OCD in the vehicle in response to receiving the scan request signal at each transceiver at the first power level;
   transmitting a scan response signal indicative of the location of the OCD in the vehicle to the OCD;
   measuring a signal strength of the first power level of the scan request signal at a first transceiver to provide a first measured signal strength; and
   incrementing a first count in response to measuring the signal strength at the first transceiver prior to determining the location of the OCD.

13. The method of claim 12 wherein the a first transceiver is positioned in a driver zone of the vehicle and at least one second transceiver is positioned in a passenger zone of the vehicle.

14. The method of claim 13 further comprising transmitting the response signal to indicate whether the OCD is located in one of the driver zone, the passenger zone, and an indeterminate position within the vehicle.

15. A method comprising:
   transmitting an advertisement signal indicating vehicle motion from transceivers to an occupant communication device (OCD);
   receiving a request signal from the OCD at a power level;
   measuring a signal strength of the power level at a first transceiver in a vehicle;
   incrementing a count responsive to measuring the signal strength;
   determining an OCD location after incrementing the count ; and
   transmitting a response signal indicating the OCD location to the OCD.

16. The method of claim 15 wherein the transceivers include the first transceiver being positioned in a driver zone of the vehicle and at least one second transceiver being positioned in a passenger zone of the vehicle.

* * * * *